United States Patent
Kraus et al.

(10) Patent No.: US 10,043,288 B2
(45) Date of Patent: Aug. 7, 2018

(54) METHODS FOR MONITORING COMBUSTION PROCESS EQUIPMENT

(71) Applicant: Honeywell International Inc., Morris Plains, NJ (US)

(72) Inventors: Kurt Kraus, Tulsa, OK (US); Matthew Martin, Tulsa, OK (US); James W. Harris, Aurora, IL (US); Robert James Rose, Cary, IL (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/334,219

(22) Filed: Oct. 25, 2016

(65) Prior Publication Data
US 2017/0148184 A1 May 25, 2017

Related U.S. Application Data

(60) Provisional application No. 62/253,375, filed on Nov. 10, 2015.

(51) Int. Cl.
*G06K 9/00* (2006.01)
*G06T 7/60* (2017.01)
(Continued)

(52) U.S. Cl.
CPC .......... *G06T 7/60* (2013.01); *G01F 1/76* (2013.01); *G06T 15/08* (2013.01); *G06T 2207/10012* (2013.01)

(58) Field of Classification Search
CPC ....... G06T 7/60; G06T 7/0075; G06T 7/0022; G06T 15/08; G06T 2207/10012; G01F 1/76; H04N 13/0239; H04N 13/0082
See application file for complete search history.

(56) References Cited

U.S. PATENT DOCUMENTS

| | | | | |
|---|---|---|---|---|
| 4,527,427 A | * | 7/1985 | Grunwald | G01F 1/76 73/204.15 |
| 4,838,738 A | * | 6/1989 | Salter | B01J 8/001 406/12 |

(Continued)

FOREIGN PATENT DOCUMENTS

| | | |
|---|---|---|
| CN | 102881041 A | 1/2013 |
| CN | 104299268 A | 1/2015 |

(Continued)

OTHER PUBLICATIONS

Lohr, M.B. et al., "Three dimensional temperature estimation of a fire plume using multiple longwave infrared camera views", Proceedings of SPIE—The International Society for Optical Engineering, vol. 9071, 2014, Article No. 90711C Infrared Imaging Systems: Design, Analysis, Modeling, and Testing XXV; Baltimore, MD; United States; May 6, 2014 through May 8, 2014; Code 106798.

(Continued)

*Primary Examiner* — Amir Alavi

(57) ABSTRACT

Example methods provided herein generate and employ three-dimensional (3D) reconstructed images of process equipment or areas within various environments in which combustion processes takes places. These three-dimensional images are generated with data provided from imaging devices. The imaging devices are disposed or positioned at multiple vantage points, and in various ways, to monitor process equipment in the environment.

4 Claims, 7 Drawing Sheets

(51) Int. Cl.
*G06T 15/08* (2011.01)
*G01F 1/76* (2006.01)

(56) References Cited

U.S. PATENT DOCUMENTS

| | | | |
|---|---|---|---|
| 5,193,388 A * | 3/1993 | Kleinhans | F02D 41/187 |
| | | | 73/114.34 |
| 5,743,079 A * | 4/1998 | Walsh | F02C 9/28 |
| | | | 60/39.281 |
| 6,528,027 B1 | 3/2003 | Brewer et al. | |
| 7,358,860 B2 | 4/2008 | Germouni et al. | |
| 7,440,620 B1 | 10/2008 | Aartsen | |
| 8,138,927 B2 | 3/2012 | Diepenbroek et al. | |
| 8,428,391 B2 | 4/2013 | Park | |
| 9,196,032 B1 | 11/2015 | Kraus et al. | |
| 9,212,851 B2 | 12/2015 | Martin et al. | |
| 2003/0158830 A1* | 8/2003 | Kowalczyk | G06K 9/6269 |
| | | | 706/16 |
| 2006/0005542 A1* | 1/2006 | Campbell | F02C 6/00 |
| | | | 60/723 |
| 2011/0085030 A1 | 4/2011 | Poe et al. | |
| 2013/0235163 A1 | 9/2013 | Joo | |
| 2015/0101393 A1* | 4/2015 | Fogwill | G01F 1/76 |
| | | | 73/23.31 |
| 2015/0355030 A1 | 12/2015 | Au et al. | |
| 2015/0362372 A1 | 12/2015 | Venkatesha et al. | |
| 2017/0148184 A1* | 5/2017 | Kraus | G06T 7/60 |

FOREIGN PATENT DOCUMENTS

| | | |
|---|---|---|
| JP | 2000259230 A | 4/2006 |
| JP | 2009014359 A | 1/2009 |

OTHER PUBLICATIONS

Verstockt, S. et al., "FireCube: A multi-view localization framework for 3D fire analysis", Fire Safety Journal, vol. 46, Issue 5, Jul. 2011, pp. 262-275.
Pizzuti, L., "Influence of refraction and divergence of light on tomography of axisymmetric laminar diffusion flames", Fuel, vol. 106, 2013, pp. 372-379.
Wang, F. et al., "Effects of particle concentration and optical thickness on flame temperature field reconstruction", Yi Qi Yi Biao Xue Bao/Chinese Journal of Scientific Instrument, vol. 28, Issue 11, Nov. 2007, pp. 2003-2007.
Li, X. et al., "Volumetric imaging of turbulent reactive flows at kHz based on computed tomography", Optics Express, vol. 22, Issue 4, Feb. 24, 2014, pp. 4768-4778.

* cited by examiner

METHODS FOR MONITORING COMBUSTION PROCESS EQUIPMENT

CROSS-REFERENCE TO RELATED APPLICATION

This application claims priority from Provisional Application No. 62/253,375 filed Nov. 10, 2015, the contents of which are hereby incorporated by reference

BACKGROUND OF THE INVENTION

This invention relates generally to methods and systems for combustion processes, and more particularly to methods for remotely monitoring conditions of a combustion process.

Accurately analyzing internal conditions of a combustion process is an essential task for an operator to better control temperatures of different regions in an environment, such as a furnace or flare, for producing products more efficiently and for saving energy-related costs. Typically, image-capturing devices, such as color cameras, infrared spectrometers, filtered cameras, and the like, are installed in the environment (e.g., in an enclosure) for detecting the temperatures of the environment. Intensities of image pixels received from the devices have a direct relationship with the temperatures of viewed surfaces inside the environment. Similarly, multi-spectral cameras have been used to detect the temperature of a flame and gas species.

Certain methods of video-based technology provide color or intensity images to the operator allowing the operator to manually interpret the state of the combustion process based on the images. An example intensity-temperature calibration and transformation is provided in commonly assigned US 2015/0362372 A1. Another technology performs off-line intensity-temperature calibration and maps each color image to a specific temperature image, thereby providing a two-dimensional (2D) projection of the temperature and/or radiance field. Other technologies, such as laser and acoustic sensing, offer three-dimensional (3D) temperature and/or radiance field estimation at specific locations inside the furnace enclosure. However, a number of required sensors, a related cost, and a complicated installation often make such systems impractical in a large-scale enclosure. Example 3D temperature and/or radiance field estimation systems and methods are provided in commonly assigned U.S. Pat. No. 9,196,032 and U.S. 2015/0355030A1.

The 3D visualization of a combustion operation inside an enclosure in refining and petrochemical industries has been a difficult task. In a furnace, for example, small viewports on a side of the furnace are typically used by furnace operators to look inside the furnace for a visual assessment of the operation. Each viewport typically provides a limited field of view, and thus some internal regions of the furnace are not clearly visible from the side viewport.

Moreover, temperatures of the internal regions of the furnace are extremely high adjacent the viewports, and thus it may be undesirable to stand close to the viewports for the operators. In certain cases, the operators commonly experience heat exhaustion and minor skin burns while standing near the viewports for visual assessment of the combustion process. Due to this exceptionally uncomfortable and undesirable experience of being close to the viewports, the operators often make a hasty interpretation of what has been viewed through the viewports, thereby causing inaccurate assessment of the combustion process.

Another technology for video-based, three-dimensional temperature and/or radiance field estimation applies thermal radiation transfer equations to temperature images. However, this method is inefficient and inaccurate, and does not provide a required resolution and accuracy due to complex, iterative computations required to resolve unknown temperature and radiance fields in the enclosure. Another cause of inaccuracy is poor-quality images due to incorrect or limited controls of the image-capturing devices. Achieving an acceptable accuracy in high resolution and accurate alignment of the images, along with information about a physical structure of the enclosure, are essential. Further, relative positions of the image-capturing devices and imaging areas, such as enclosure walls, often shift their alignments and thus cause significant errors.

Further, in environments such as petrochemical and refinery environments, the process and furnace conditions often change due to upstream conditions, sometimes in an uncontrollable manner. Environment parameters, such as a feed flow, a burner fuel flow, or a furnace draft, can drastically change in a short time period. As a result, the conditions in an environment such as a furnace can change significantly. For example, changes in flame shape can lead to increased production of carbon monoxide (CO) or nitrogen oxide (NOx) gases. Similarly, an increase in flame length can produce flame impingement in the process piping, undesirably changing the conditions for the chemical processes occurring therein. To maintain optimal process conditions and to operate in a desired manner, burner adjustments need to be performed when such conditions occur. However, manual adjustments can be time-consuming and expensive, and further delay current operation during the adjustments. Further, such adjustments are subject to the judgement of the operator, who often does not have the support of various data and measurements related to environmental conditions, thereby causing inaccurate and ineffective adjustments.

Therefore, there is a need for improved methods of analyzing conditions of a combustion process in an environment.

SUMMARY OF THE INVENTION

An aspect of the present invention is directed to providing a method for monitoring combustion products within an environment. In an example method, a three-dimensional reconstructed image of temperature and radiance fields within the environment is determined. A temperature control volume within the three-dimensional reconstruction is defined using one or more isosurfaces of a threshold temperature. A mass flow rate of one or more species of interest through the defined control volume is determined.

In some embodiments, determining a three-dimensional reconstructed image comprises acquiring a set of images from a plurality of image capturing devices disposed or positioned to provide multiple vantage points within the environment, and computing the three-dimensional reconstructed image from the acquired set of images.

In some embodiments, defining a temperature control volume comprises setting one or more threshold temperatures, providing an isosurface for each of the set threshold temperatures for the determined three-dimensional reconstructed image, and defining the temperature control volume from the provided isosurfaces.

In some embodiments, the method further comprises determining a volume and a surface area of the defined temperature control volume.

In some embodiments, the method further comprises calculating a destruction efficiency using the determined mass flow rate for the one or more species of interest.

In some embodiments, the method further comprises calculating a combustion efficiency using the determined mass flow rate for the one or more species of interest.

In some embodiments, the destruction efficiency and the combustion efficiency are repeatedly calculated over a time interval, and the method further comprises determining an overall destruction efficiency and an overall combustion efficiency over the time interval.

In some embodiments, the image capturing devices comprise cameras, and the acquired set of images are spectral images for visible, ultraviolet or infrared light.

Other embodiments, of the present invention include at least two, at least three, or all of the above described features.

Other aspects of the invention provide a method for detecting a flaring event within an environment. Images are acquired of a flare from a plurality of image capturing devices disposed or positioned at a plurality of vantage points within the environment. A three-dimensional reconstructed image of the flare is generated using the acquired images. The three-dimensional reconstructed image is compared to a set of three-dimensional images to detect the flaring event.

In some embodiments, the comparing comprises determining a similarity or difference between the three-dimensional reconstructed image and each of the set of three-dimensional images, and determining whether the similarity or difference meets a predetermined threshold.

In some embodiments, the comparing uses one or more of wavelet comparison, scale variance, differencing, coefficients of radial basis function comparisons or Fourier transform coefficient comparisons.

In some embodiments, each of the set of three-dimensional images represents an optimal or a sub-optimal flare tip pattern.

In some embodiments, the set of three-dimensional images are stored within a database accessible by a monitoring unit.

In some embodiments, the method further comprises generating an alert if the flaring event is detected.

Other embodiments of the present invention include at least two, at least three, or all of the above described features.

Other aspects of the invention provide a method of detecting a leak of one or more monitored items in an environment. Images are acquired from a plurality of imaging devices providing a plurality of vantage points of the one or more monitored items. A three-dimensional reconstructed image of a field of view of the environment is generated that includes the one or more monitored items. A presence of a selected species within the three-dimensional reconstructed image is determined to detect the leak.

In some embodiments, determining a presence comprises comparing one or more voxel values within the three-dimensional reconstructed image to stored values indicating a presence of the selected species to determine whether the compared voxel values meet or exceed a threshold.

In some embodiments, the selected species is selected to indicate a non-combustible leak.

In some embodiments, the monitored items include one or more flanges.

In some embodiments, the selected species is selected to indicate a combustible leak, and determining that an uncontrolled fire is present in the environment is based on the determining a presence of the selected species.

In some embodiments, the method further comprises generating an alert if the selected species is present.

Other embodiments of the present invention include at least two, at least three, or all of the above described features.

Processes including at least one of the above aspects are beneficial and desirable for the reasons described herein.

In yet another aspect of the present invention, a method includes at least two, at least three, or all of the above described aspects of the present invention.

It will be appreciated that disclosure herein related to methods is likewise applicable to software, hardware, firmware, computing devices, or systems configured to implement such methods.

Additional objects, embodiments, and details of the invention are set forth in the following detailed description.

DETAILED DESCRIPTION OF THE DRAWINGS

DETAILED DESCRIPTION

Figure 1:
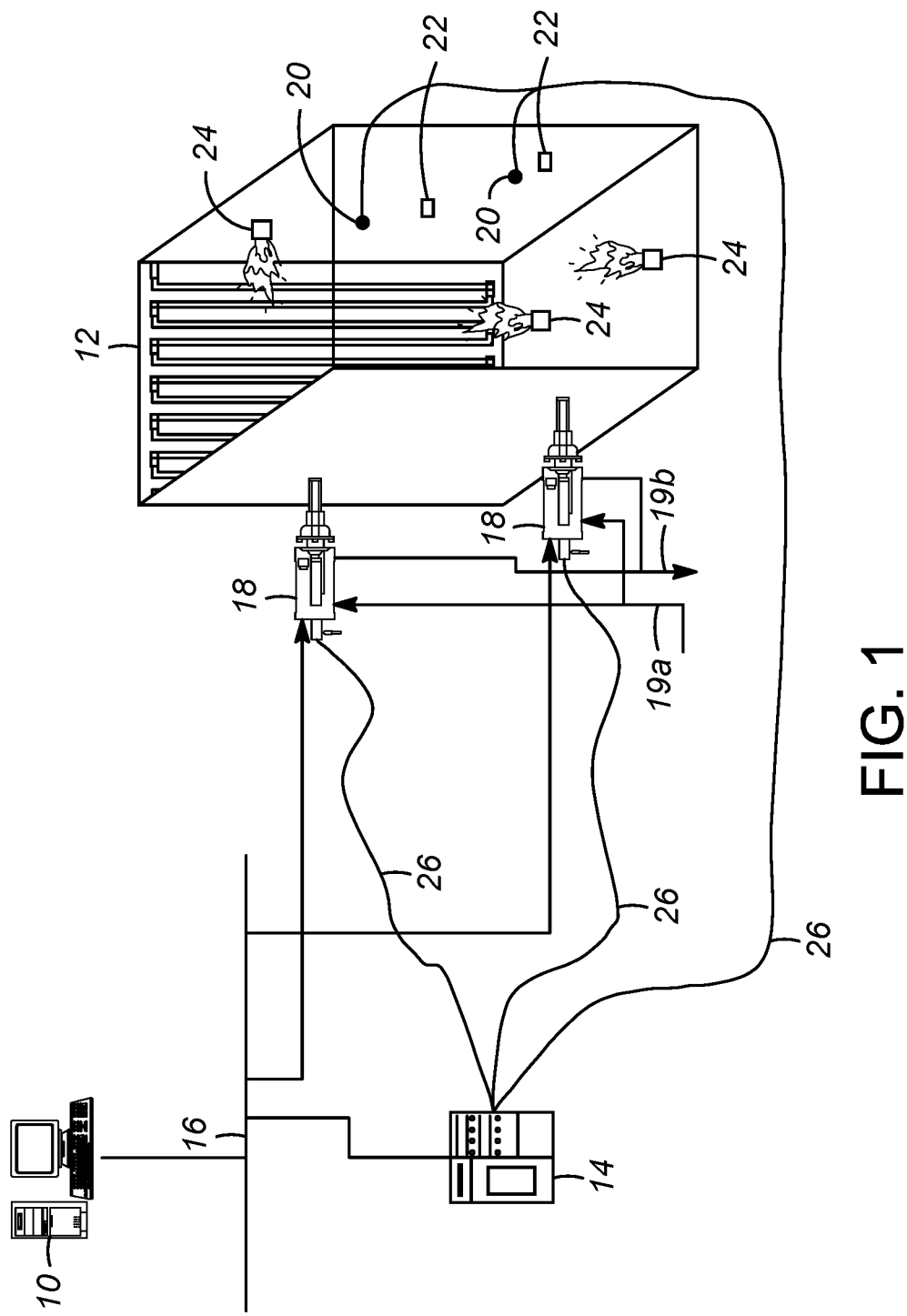
FIG. 1 shows an example combustion environment including a system that performs a monitoring method according to an embodiment of the invention.

Example methods provided herein generate and employ three-dimensional (3D) reconstructed images of process equipment or areas within various environments in which combustion processes take place, such as furnaces or flares. These three-dimensional images are generated with data provided from image capturing devices such as cameras. The image capturing devices are disposed or positioned at multiple vantage points, and in various ways, to monitor process equipment in the environment. For example, the image capturing devices can be fixed or temporarily (movably) mounted on ground based fixtures or structures. As another example, the image capturing devices can be fixed or temporarily (movably) mounted on one or more flying vehicles, which can be manually operated, autonomously operated, remotely controlled, etc.

In some example methods, 3D reconstruction is used to passively monitor combustion products to determine destruction efficiency and/or combustion efficiency. In other example methods, 3D reconstruction is used to detect combustible leaks, which can result in uncontrolled flames at process equipment. In still other example methods, 3D reconstruction is used to detect flare events. In yet other example methods, 3D reconstruction is used for non-combustible leak detection.

In practice, example methods may be applied to any environment in which flames are generated by, for example, premix, diffusion mix, solid fuel, liquid fuel, and gaseous fuel used in industrial, residential, commercial, or power burners, flares, or thermal oxidizers. It is also contemplated that example methods may be used to validate and/or optimize indications resulting from computational models of physical systems.

Example embodiments of the invention can also be implemented in software, e.g., a standalone product, or part of an overall detection or control system that includes imaging devices and one or more units configured for performing example methods.

An example method according to one aspect of the invention passively measures combustion product and determines, preferably continuously and online, the destruction efficiency and combustion efficiency of a single flame or each flame in a plurality of flames that are not individually contained, e.g., in a vessel, for collection of combustion products. "Destruction efficiency" refers to a measure of how much of an original reactant, usually a hydrocarbon, in a reduction-oxidation is oxidized. Destruction efficiency can define an amount of waste desired to be combusted, which can be expressed as a fraction left of a total amount. "Combustion efficiency" refers to a measure of how completely combustion fuels, usually hydrocarbons, burn to water vapor and carbon dioxide.

When a combustion process (i.e., flame) is contained, singularly or in plural, the average combustion products may be measured in aggregate by known in situ or extractive gas sampling methods, and the destruction efficiency and combustion efficiency may be calculated directly. However, the combustion products of individual flames that are either not individually contained or are open to the atmosphere, such as on a flare, cannot be measured in aggregate or in situ by such known extractive gas sampling methods.

Direct measurements of combustion products from flare flames, for example, currently require a sample hood (or other physical sampling apparatus) to be positioned over or near the flame to collect all or a portion of the combustion products for sampling and analysis. Such hood sampling techniques are not practical or applicable to commercial scale flames in service, as the hood is difficult or impossible to position and maintain in position over individually enclosed flames. Individually enclosed flames include, for example, those in a fired heater, or open flames, such as those on a flare.

Further, such a hood itself does not serve as part of the original combustion process, and thus the resulting measurements are not representative of unmolested combustion processes. Also, the hood (or other physical sampling apparatus) may not capture all of the combustion products, and therefore sampling and calculation methods are required that extrapolate, estimate, or make assumptions about the condition and quality of the combustion products from the balance of the combustion process.

By contrast, example methods herein provide passive methods that can be employed to measure the combustion products of the entire individual flame or plural flames and determine the destruction efficiency and combustion efficiency, preferably without interfering, impeding, or otherwise altering the combustion process.

In an example method, a plurality of cameras or other image capturing systems are disposed or positioned to observe the combustion process in such a way that three-dimensional images and indications of temperature, radiance, and species of the complete combustion space or flame can be rendered and stored for further processing, e.g., in a database system. Example methods for remote passive monitoring and observation of flames and combustion processes in visible spectrum and beyond visible spectrum (such as infrared or ultraviolet) camera and imaging systems are also provided.

Referring now to FIG. 1, an exemplary monitoring unit 10 is provided for analyzing conditions of a combustion process inside a large-scale enclosure 12, such as an industrial furnace. As used herein, the term "unit" may refer to, be part of, or include an application specific integrated circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units 12, the scope of example processes should not be so limited since other modifications will become apparent to the skilled practitioner.

The monitoring unit 10 is coupled to a server 14 or computing device (including, e.g., a database and video server), and is programmed to perform tasks and display relevant data for different functional units via a network 16. It is contemplated that various suitable networks could be used, such as a corporate Intranet, a local area network (LAN) or a wide area network (WAN), and the like, using dial-in connections, cable modems, high-speed ISDN lines, and other types of communication methods known in the art. All relevant information can be stored in the databases for retrieval by the monitoring unit 10 or the computing device 14 (e.g., as a data storage device and/or a machine readable data storage medium carrying computer programs).

A plurality of image capturing devices, such as cameras 18, are mounted to view one or more flames 24 (two cameras are shown in FIG. 1, but additional cameras could be included, if desired). For example, the cameras 18 can be fixed or temporarily (movably) mounted on ground based fixtures or structures. As another example, the cameras 18 can be fixed or temporarily (movably) mounted on one or more flying vehicles, which can be manually operated, autonomously operated, remotely controlled, etc., to position the cameras.

The cameras 18 preferably have the ability to capture the response in one or multiple parts of the electromagnetic spectrum, such as one or more of visible, ultraviolet, near infrared (NIR), mid wave infrared (MWIR), and long wave infrared (LWIR). The cameras 18 can be configured to capture data in specific spectrum bands as required by detection of targeted gas species (e.g., detect presence of carbon monoxide). In addition, the cameras 18 can be auto-configured to detect a specific range of temperatures or radiance field. Further, each of the cameras 18 can be individually configured for a specific spectrum band to increase the efficiency of the system and enable detection of multiple gas species in one or different regions of the flame 24. Each camera 18 can be liquid-cooled by directing the inflow of cold coolant to the camera via cold coolant input line 19a, and delivering the outflow of warm coolant from the camera to an outlet via cold coolant output line 19b.

Each of the cameras 18 capture image sequences covering a selected interior portion or region of the flame 24 or multiple flames, for which a temperature-radiance field and gas species field are to be estimated. A plurality of temperature sensors 20, such as thermocouples or pyrometers, which are each observable by the cameras 18, can also be placed inside of the enclosure 12. Optional markers 22, which are within a field of view (FOV) of the cameras 18, may also be placed inside of the enclosure 12. Sensors, as with the cameras 18 or other imaging devices, can be fixed or temporarily (movably) mounted on ground based fixtures or structures, or can be fixed or temporarily (movably) mounted on one or more flying vehicles, which can be manually operated, autonomously operated, remotely controlled, etc., to position the sensors.

The enclosure 12 is preferably also equipped with additional sensors and instruments, such as gas analyzers, pressure indicators, and thermocouples, for measuring excessive oxygen (O2), unburned hydrocarbons, carbon monoxide (CO), vessel temperature, and vessel pressure. Other measurements, such as local temperatures in the enclosure 12 and on process piping, fuel pressure, and the like are also contemplated to suit the application. All signals from these sensors and instruments can also be sent to the monitoring unit 10.

Cables 26 (or other signal transferring devices, such as wireless communication devices) connect the cameras 18 to the computing device 14, which may also have digitization, storage, and user interface capabilities. The computing device 14 receives image sequences from the cameras 18 (and temperature outputs or signals from temperature sensors, if any) to set proper parameters of the cameras for performing subsequent calibration, registration, and estimating temperature-radiance field of the selected region.

Figure 2:
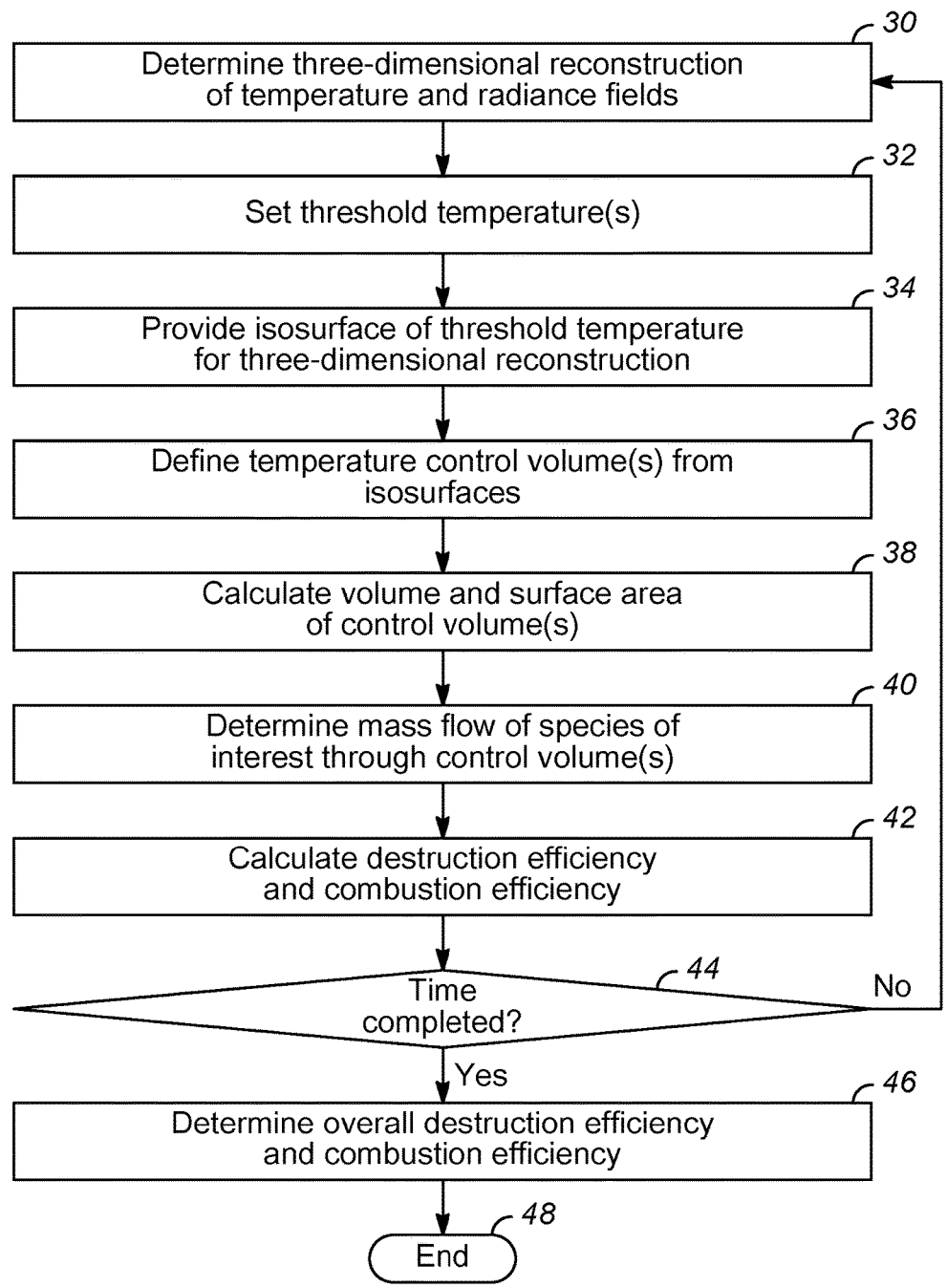
FIG. 2 shows an example method for monitoring a combustion process.

FIG. 2 shows an example method for measurement of combustion products for passively determining destruction efficiency and/or combustion efficiency of a combustion process. In an example method, the monitoring unit 10 computes a three-dimensional reconstruction of temperature and radiance fields within the enclosure 12 (step 30) using an acquired set of images from the cameras 18. The images are captured by optimally placing the cameras 18 in the enclosure 12 so that the combustion environment is within the cameras' field of view. As shown in FIG. 1, the plurality of cameras 18 are disposed or positioned at multiple vantage points to provide multiple fields of view in the enclosure 12, and in an example embodiment the plurality of temperature sensors 20 are further disposed or positioned at selected locations in the enclosure for capturing data.

The monitoring unit 10 acquires the captured images from the cameras 18 and provides visual feedback of the captured images in a 2D or 3D orientation. Further, the monitoring unit 10 calculates temperature and radiance fields of the complete combustion space or flame based on the collected data.

In a preferred embodiment, the cameras 18 are strategically placed or otherwise disposed or positioned in or around the enclosure to provide maximum coverage of the internal view of the flames produced by the burners. The captured images are sent to the monitoring unit 10, preferably in real time. The monitoring unit 10 includes computer software, having one or more units, which collects all associated data (e.g., images, physical readings, etc.) and elaborates them, taking into account the enclosure geometry. It will be appreciated that the computing device 14 can also be considered part of the monitoring unit 10 if it is configured to perform one or more steps of example methods.

The images are compiled and combined by the monitoring unit to produce one or more reconstructed 3D fields of the interior region or prospect of the enclosure. It is contemplated that the monitoring unit and the image-capturing devices are communicated wirelessly in real time, but other suitable communication methods are also contemplated to suit different applications.

For example, various methods are available for creating three-dimensional images and data sets of image information of combustion process (that is, flame) temperatures, radiance, and indicated local compositions of intermediate or final products of combustion. Products of complete combustion of hydrocarbon flames in oxygen include, e.g., carbon dioxide, water, nitrogen (if the oxidant is partially or completely air), and excess oxygen. Products of combustion of incompletely combusted hydrocarbon flames include, e.g., carbon monoxide, unburned hydrocarbons, and hydrogen. The local indicated presence and concentration of partial products (e.g., carbon monoxide) and complete products (e.g., carbon dioxide) can be detected by the cameras 18 for visual field or infrared field. Using a plurality of such cameras, a location in three-dimensional space can be determined and recorded in the accessible database as data sets.

An example three-dimensional radiance and gas species field estimation method will now be described. The example method utilizes an array of detectors, such as multi-spectral image capturing devices, e.g., cameras such as cameras 18, disposed in an array alignment surrounding an enclosure (e.g., enclosure 12), such as a furnace. By surrounding the enclosure in an array alignment, tomographic reconstruction, triangulation, or other processing techniques can be used to establish three-dimensional concentrations and spatial physical locations of various combustion intermediate or final products. The intermediate or final products can include chemical radicals and molecules, such as OH, NO, $NO_x$, CO, $CO_2$, N, $N_2$, O, H, $H_2$, $H_2O$, C, S, SO, $SO_2$, and $SO_3$.

High resolution of the resulting image and data may be derived based on the images obtained from the detectors. Multiple detectors can be arranged, for example, in a spaced pattern array configuration, so that failures of one or more detectors due to breakage, fouling, blocked field of view or other similar defects, only affect a part of the array, and the remaining, functional detectors can continue to provide images and associated data. Each detector can detect an intensity of various light emissions from atomic or molecular species residing in the enclosure across a predetermined span of a light spectrum. Each atomic particle is known to emit at a specific frequency. Since the particle's light emission frequency is unique and identifiable from those of other resident or potentially resident particles, an individual constituent can be automatically identified by a computer processor. Based on the intensity of the frequency of detected radiance, an associated degree of concentration or relative location can be inferred using the computer processor.

By computationally employing tomographic reconstruction, triangulation, or other suitable processing techniques to combine the data from an array of detectors, three-dimensional geometric and spatial properties of various species or atomic particles/molecules can be determined. Further, the determination of the location and concentration of various chemical constituents within the enclosure can be performed in real-time and on-line to modulate input streams or mechanical aspects of the burners/flame for optimization of desired properties of the radiance and gas species fields in the enclosure.

In an example operation of a three-dimensional radiance and gas species field estimation method, an estimation unit, also referred to as a 3D radiance field estimator, computes the three-dimensional radiance fields of the enclosure. The estimation unit can be, for example, incorporated into the monitoring unit 10. Each three-dimensional radiance field corresponds to a particular spectral wavelength, $\lambda_i$. Having received the multi-spectral images from the multi-spectral image capturing devices, the 3D radiance field estimator segregates the multi-spectral images into groups of images, each group corresponds to images of a spectral wavelength, $\lambda_i$. Using each group of images of a spectral wavelength, $\lambda_i$, the 3D radiance field estimation process generates a 3D radiance field at wavelength, $\lambda_i$. As a result, groups of 3D radiance fields at wavelengths $\lambda_{1, 2, 3}, \ldots, n$ are generated. The different wavelengths may correspond to spectral bands in the visible spectrum, e.g., red, blue and green or other spectral bands of the ultra-violet, mid-wave infrared and long-wave infrared spectra.

Each of the 3D radiance fields has respective voxels. A 3D radiance field is composed of voxels. A voxel represents a 3D volume region in the enclosure. Each voxel has an estimated value of the radiance at the wavelength $\lambda_i$ in a corresponding volume. A 3D total radiance field estimator combines two or more outputs of 3D radiance fields at different wavelengths. The result is a total 3D radiance field. For example, the total radiance can be computed in the visible spectrum by summing the radiance fields from red, green and blue wavelengths. A 3D gas species field estimator detects the presence of gas species and computes their radiance in each of the voxels. The output of the 3D gas species field estimator is a three-dimensional gas species field.

An explanation will now be provided for how an example estimation unit can compute a 3D radiance field from a group of images at spectral wavelength $\lambda_i$. An example estimation unit includes an intensity-temperature calibration unit, an intensity-temperature transformation unit, a registration and alignment estimation unit, a motion-corrected temperature estimation unit, a 3D temperature-radiance estimation unit and a 3D model of the enclosure.

Intensities of the image pixels received from the image-capturing devices are directly related to the temperatures of viewed surfaces in the enclosure. Calibration is performed to establish this relationship between the temperatures and intensities. According to Stefan-Boltzmann law, the radiant flux is proportional to the fourth power of the temperature. Thus, a transformation from image intensity to radiance can be established based on the intensity to temperature relationship. Herein temperature and radiance are used interchangeably.

In an example method, temperature sensors, such as temperature sensors 20, are placed at selected locations in the enclosure to be viewed or read by the image-capturing devices. The intensity-temperature calibration unit performs an on-line calibration determining a relationship between an intensity of an image pixel and an actual temperature, which is established by using polynomial regression mapping temperature outputs and the corresponding pixel intensities from the image-capturing devices with associated device settings. The intensity-temperature calibration unit also maintains records of the intensity-temperature calibration in a storage device, and can compare the calibration data on-line during the combustion process, as explained further below.

Based on the intensity-temperature calibration, the intensity-temperature transformation unit transforms the intensities of the corresponding images to the temperature values based on the device settings and the image pixels. An exemplary intensity-temperature calibration unit and the intensity-temperature transformation unit are described herein.

A dynamic range of image pixel values is limited to a number of bits per pixel. However, the temperature of the combustion process can reach up to 2500° F. or 1400° C. To cover an entire temperature range (e.g., 0-2500° F. or 0-1400° C.) the device parameters or settings, such as aperture, shutter, and gain can be selectively set and adjusted. During this intensity-temperature transformation, an intensity histogram of the image can be evaluated by the intensity-temperature transformation unit. If the histogram is skewed or becomes uneven at a low or high end, the intensity-temperature transformation unit makes appropriate changes in the parameters or settings of the image-capturing devices. This enables acquisition of the images with an optimal intensity range under the current operating conditions.

Unwanted movement of the image-capturing devices and imaging areas often occurs in the enclosure. For example, in an industrial environment, vibrations and shakings of furnace walls can be caused by adjacent pieces of equipment that are frequently in contact with the furnace during operation. Since a temperature field computation relies on an accurate line of sight association with the physical structure, significant errors result if a relative motion of the image-capturing device is not correctly set and adjusted. The accurate line of sight requirement is especially significant for a high resolution temperature field computation. Correction of these unwanted movements can be accomplished by the registration and alignment estimation unit and the motion-corrected temperature estimation unit.

The registration and alignment estimation unit computes a registration and alignment estimation for each of the multispectral image capturing devices viewing the (physical) enclosure. Characteristic features that are distinct and easily recognizable in the multispectral image, such as view ports and corners of the enclosure, are initially selected and subsequently detected. Their positional information in the image is associated with the three-dimensional geometrical coordinates of the enclosure, which can be determined from a 3D model. It is preferred that readily recognizable markers, such as triangular ceramic tiles, are placed in the enclosure. Geometrical locations of these characteristic features also constitute reference points of the enclosure. Corresponding pixel coordinates in the multi-spectral images are correlated with the geometrical locations of these markers.

The registration and alignment estimation unit calculates a perspective transformation of the multi-spectral images based on these two sets of data, i.e., the geometrical reference points and the corresponding image pixel locations. After an application of the transformation on the temperature images, two-dimensional (2D) temperature images are aligned and registered by the registration and alignment estimation unit.

The motion-corrected temperature estimation unit performs a perspective transformation on the temperature image, which is computed from the intensity-temperature transformation unit, such that the geometrical reference points and the corresponding image pixel locations are in alignment. In other words, the same pixel location represents the same physical location of the enclosure in sequence of images. The correct temperatures of the enclosure area are easily determined based on the corresponding image pixels even under relative motion of the image capturing devices. The output is a registered temperature image.

The 3D temperature-radiance estimation unit applies a hierarchical, multi-resolution method to compute a three-dimensional temperature-radiance field of the enclosure based on the registered two-dimensional temperature images. When an operator is interested in certain areas or volumes in the enclosure (e.g., burners or pipes), higher resolution is needed in the interested areas, but lower resolution is sufficient for the uninterested areas. A hierarchical coarse-to-fine algorithm can be used to achieve or perform a multi-resolution method, such as that disclosed in commonly assigned U.S. Pat. No. 9,212,851.

For example, the 3D temperature-radiance estimation unit can calculate the 3D temperature field based on a coarse resolution (e.g., 1 cubic foot). The next resolution 3D temperature field (e.g., 0.125 cubic feet) may then be computed from the results of the initial resolution. The temperature field with fine resolution can be iteratively computed. However, only areas of interest and associated voxels are typically traversed down the hierarchy to the fine resolution. Inverses of matrices calculated using a radiative transfer equation are required in each resolution computation. Using this hierarchical, multi-resolution method computational time can be significantly saved during computation, and thus can be used as a real-time, on-line application. The 3D radiance field estimator is applied to groups of spectral images at wavelength $\lambda_i$ resulting in many 3D radiance fields, each at a specific wavelength $\lambda_i$.

The 3D total radiance field estimator combines one or more 3D radiance fields to form a total radiance field of a broader spectrum, including, for example, visible or midwave infrared. Depending on the application, one of several combination methods, such as weighted sum, sum of interpolation and extrapolation, can be applied. A weighted sum method computes the total radiance as the sum of the products of radiance at wavelength $\lambda_i$ and weight $w_i$. For example, the visible spectrum radiance is often computed by a weighted sum of red, green and blue radiances. A sum of interpolation and extrapolation method first extrapolates or interpolates radiance at other wavelengths and then sum all the original, interpolated and extrapolated radiances. The result is the total 3D radiance field. For example, each voxel can have a radiance output value of $R_n$.

The 3D gas species field estimator detects and computes the composition of different gases in the enclosure based on groups of 3D radiance fields at a selected wavelength $\lambda_i$. Radiance of each voxel in a radiance field at the wavelength is contributed from that of the gas species and air in that voxel. Spatial and temporal filtering is applied to each voxel to estimate and remove its radiance due to air. The residual radiance is due to the gas species. A radiance feature vector is generated from the corresponding voxels in the groups of radiance fields. Classification methods, such as a support vector machine, random forest, Bayesian model, etc., determine the presence or absence of the target gas species. The radiance of the gas species in the output voxel can be estimated from the strength of the radiance feature vector. Compiling the results from each voxel creates a 3D gas species field.

In another example method, the 3D gas species field can be computed with a function of a threshold value or gradient in selected 3D radiance fields of specific wavelengths $\lambda_i$. For example, a voxel having high radiance or high radiance gradient relative to the average of its surrounding voxels in the visible spectrum and that same voxels having threshold value or gradient value in the blue wavelength implies the presence of hydroxyl in that voxel. A voxel having high radiance or high radiance gradient relative to the average of its surrounding voxels in the visible spectrum and that same voxels having threshold value or gradient value in the green wavelength implies hydrogen combustion in that voxel. A voxel having high radiance or high radiance gradient relative to the average of its surrounding voxels in the visible spectrum and that same voxels having threshold value or gradient value in the yellow wavelength (combination of red and green wavelengths) implies carbon cracking within a flame in that voxel. The resulting functional values can be used directly or correlated with a data table of known concentrations relative to the signal strength of the function.

Next, an example extended temperature range mapping process will be described. An image-capturing device generates a light intensity image of a selected region of the enclosure. Multiple temperature images are merged, which are transformed from images taken at different device settings or parameters, such as shutter speed, exposure time, aperture, and gain, to achieve high dynamic temperature range outputs.

An example mapping process utilizes the image-capturing device to capture multiple images using various device settings. In operation, when an amount of emitted radiation at a specific device setting saturates the intensity of an image pixel, the same amount of emitted radiation at another device setting may not saturate the intensity of the image pixel in a corresponding image captured by the image-capturing device. As such, the temperature value of the region corresponding to the pixel location can be estimated using the unsaturated image pixel.

Generally, an intensity of a corresponding image pixel is transformed to a temperature based on device settings of the image-capturing device and the image pixel. Then, an intensity to temperature transformation process performs computation or estimation of the temperatures of image pixels in a field of view (FOV) of the corresponding image-capturing device by using an intensity-temperature calibration function.

In an example mapping method, the temperatures are computed and estimated from a set of intensity images, which are captured by image-capturing devices that are optimally placed in or in association with the enclosure, as provided above. A plurality of temperature sensors are also disposed at selected locations of the enclosure for collecting data, as provided above.

When the amount of emitted radiation at a first predetermined device setting saturates the intensity of an image pixel, the amount of emitted radiation at a second predetermined device setting may not saturate the same image pixel in the corresponding image due to a different device setting. Conversely, if the amount of emitted radiation at the second predetermined device setting is too low or underexposed in the image, the amount of emitted radiation at the first predetermined device setting may provide better image intensities at the same pixel in the image. A mapping unit, which may be, for example, part of the estimation unit 10, performs a temperature mapping process or method that substitutes or replaces overexposed or underexposed portions of the image for providing an extended temperature mapping of the enclosure.

If the number of bits per pixel in the image-capturing devices is equal to 8, the device can measure $2^8$ (or 256) distinct temperature values (e.g., 0-255). Specifically, when the region is saturated or overexposed, the temperature value is read as 255, and when the region is underexposed, the temperature value is read as zero (0). Thus, the temperature value of each of the overexposed regions is equal to a maximum value (i.e., 255) that is detectable by the image-capturing device, and similarly, the temperature value of each of underexposed regions is equal to a minimum temperature value (i.e., 0) that is detectable by the image-capturing device, regardless of the fact that the regions may have different temperature values in reality.

A explanation will now be provided for how an example mapping unit provides an intensity to temperature mapping method for providing an extended temperature mapping of all regions of the enclosure. Typically, the temperature of a combustion process can reach up to 2500 degree Fahrenheit (or ° F.) or 1400 degree Celsius (or ° C.). To cover an entire temperature range (e.g., 0-2500° F. or 0-1400° C.), the device parameters or settings, such as aperture, shutter speed, exposure time, and gain can be selectively set and adjusted. Thus, various intensity-temperature calibration functions can be established based on specific device settings.

Temperature, T, can be represented as a function of image pixel intensity, I, at various device settings, $S_i$. Each intensity-temperature function of an image-capturing device can be calibrated at different device settings $S_1$, $S_2$. Thus, each device setting $S_1$, $S_2$ offers optimal responses to a temperature range $R_1$, $R_2$. As such, the first temperature range $R_1$ represents a valid range of temperatures for the first predetermined device setting $S_1$, and similarly, the temperature range $R_2$ represents a valid range of temperatures for the second predetermined device setting $S_2$. The same pixel intensity $I_1$ can correspond to different temperature values $T_1, T_2, \ldots T_N$ based on a selected device setting $S_1, S_2, \ldots S_N$. For example, the intensity of 100 units may represent the temperature values of 800, 1200, and 1800° F. (or 430, 650, and 980° C.) in three different images taken at device settings $S_1$, $S_2$, or $S_N$, respectively. An exemplary pixel intensity I may be defined as provided by expression 1 below.

$$T = f\{I, S\} \qquad (1)$$

In this example, considering an 8-bit image capturing device, when the first image-capturing device is set to detect the emitted radiation at the first predetermined device setting $S_1$, the measurable temperature range $R_1$ may be between 500-1100° F. (or 260-600° C.), wherein the minimum temperature value MIN of 500° F. is read as zero (0) pixel intensity, and the maximum temperature value MAX of 1100° F. is read as 255. Thus, certain regions of the enclosure having temperatures lower than 500° F. are underexposed and still read as 0, and other regions having temperatures higher than 1100° F. are saturated or overexposed and also read as 255. An intensity-temperature relationship, e.g., represented by a graph, is associated with the first predetermined device setting $S_1$.

Similarly, when the same image-capturing device is set to detect the emitted radiation at the second predetermined device setting $S_2$, the measurable temperature range $R_2$, for this example, may be between 1000-1600° F. (or 530-900° C.), wherein the minimum temperature value of 1000° F. is read as zero (0), and the maximum temperature value of 1600° F. is read as 255. Thus, certain regions of the enclosure having temperatures lower than 1000° F. are underexposed and read as 0, and other regions having temperatures higher than 1600° F. are saturated or overexposed and read as 255. A second intensity-temperature relationship, e.g., represented by a graph, is associated with the second predetermined device setting $S_2$. A shared area between the two intensity-temperature relationship graphs represents a common temperature range (i.e., 1000-1100° F. or 530-600° C.) where either one of the graphs can be used to estimate identical temperature values. The temperature estimates in this common temperature range can also be used to improve the accuracy of the estimated temperature as part of the calibration process.

Likewise, when the same image-capturing device is set to detect the emitted radiation at the third predetermined device setting $S_N$, the measurable temperature range, for this example, may be between 1500-2500° F. (or 810-1400° C.), wherein the minimum temperature value of 1500° F. is read as zero (0), and the maximum temperature value of 2500° F. is read as 255. Thus, certain regions of the enclosure having temperatures lower than 1500° F. are underexposed and read as 0, and other regions having temperatures higher than 2500° F. are saturated or overexposed and read as 255. A third intensity-temperature relationship, e.g., represented by a graph, is associated with the third predetermined device setting $S_N$.

As a result, by merging or coalescing the intensity-temperature relationships (e.g., graphs) for $S_1$, $S_2$, and $S_N$, an extended temperature profile covering the temperature range of 500-2500° F. (or 260-1400° C.) is achieved from the different images captured using different device settings. Of course, other temperature ranges than those provided in this example for each image-capturing device viewing other regions of the enclosure are also contemplated. Preferably, each temperature range overlaps at least one of the other temperature ranges, such as where the upper endpoint of the first range and the lower endpoint of the second range overlap by 100° F., and the upper endpoint of the second range and the lower endpoint of the third range also overlap by 100° F. Other overlap amounts besides 100° F. are also contemplated, and it is also contemplated that different overlap amounts could be used between each of the various temperature ranges.

The example temperature mapping method substitutes or replaces overexposed or underexposed portions of the images with portions unaffected by the overexposure or underexposure from other images captured by using different device settings, thereby providing an extended temperature mapping of the enclosure. In one embodiment, the mapping unit selects various, distinct predetermined device settings $S_1$, $S_2$ for detecting different temperature ranges $R_1$, $R_2$ of the same FOV. In this example, the first image-capturing device is set at the first predetermined device setting $S_1$ having the exposure time e1 and the gain g1. A first image $IMAGE_1$ captured by the first image-capturing device using the setting $S_1$ (e1, g1) shows various temperature regions based on a pair of the observed pixel intensity and the corresponding temperature values (I, T). A certain portion of the temperature region has a distinct intensity-temperature value. As an example, (I=150, T=600) represents the intensity of 150 and the temperature value of 600° F. (or 316° C.).

When the mapping unit identifies one or more saturated (or alternatively, underexposed) regions in the first image $IMAGE_1$ based on the corresponding temperature values of the regions, the saturated (or alternatively, underexposed) regions are substituted or replaced by additional acceptable regions from other images having a substantially identical FOV. The term "acceptable regions" refers to the regions that are neither overexposed nor underexposed, whereas the term "poor responsive regions" refers to the regions that are either overexposed or underexposed. For example, if one or more regions of $IMAGE_1$ having the same intensity-temperature value (255, 1000) are saturated and read as 255, then the mapping unit will retrieve the corresponding regions in other images that share substantially the same FOV.

A second image $IMAGE_2$ captured by the same image-capturing device using the setting $S_2$ (e2, g2) shows various temperature regions based on the pair of the observed pixel intensity and the corresponding temperature (I, T) as in the first image $IMAGE_1$ having substantially the same FOV. However, because the second image is captured with the second predetermined device setting $S_2$ and thus is capable of detecting a different temperature range than that of the first image, the regions in $IMAGE_1$ having the intensity-temperature value (255, 1000) are not saturated in the second image $IMAGE_2$. The mapping unit creates sub-regions having different intensity-temperature values of the unsaturated regions in the second image $IMAGE_2$, designated (127, 920), (150, 1020), and (120, 880), and selects or flags the unsaturated regions as the additional acceptable regions.

Similarly, the temperature mapping method can be performed for the underexposed regions by the mapping unit to obtain better temperature resolution in the low temperature range (e.g., 100-500° F.). For example, the regions in $IMAGE_2$ having the intensity-temperature value (10, 150) can be replaced with the regions in the first image $IMAGE_1$, designated (20, 100), (40, 200), and (60, 350) due to the regions not under-saturated in $IMAGE_1$. As such, the temperature mapping method can be iteratively performed for the poor responsive regions by the mapping unit to obtain better temperature resolution in the low (e.g., below 500° F. or 260° C.) and high (e.g., above 2500° F. or 1400° C.) temperature ranges.

Accordingly, a combined image $IMAGE_{FUSED}$ is generated by combining acceptable or valid regions of the first and second images $IMAGE_1$, $IMAGE_2$, by complementarily replacing or substituting the overexposed or underexposed regions in $IMAGE_1$ and $IMAGE_2$. In a preferred embodiment, the temperature values are combined for the fused image $IMAGE_{FUSED}$. The intensity of a particular pixel in the combined image $IMAGE_{FUSED}$ is derived from the corresponding intensity of image pixel in the first and second images $IMAGE_1$, $IMAGE_2$ captured at two different gain and exposure settings $S_1$ (e1, g1), $S_2$ (e2, g2) using the corresponding intensity to temperature mapping functions. The resulting $IMAGE_3$ can be used for display purposes. Thus, the intensity values and the device settings associated with the first and second images $IMAGE_1$, $IMAGE_2$ are different and may not be combined directly in the fused image $IMAGE_{FUSED}$.

Original or initial images $IMAGE_1$, $IMAGE_2$ are selected such that the chosen pixels are neither oversaturated nor underexposed. When a multispectral imager is used, the pixels should be valid in all channels. Although the original images $IMAGE_1$, $IMAGE_2$ may have an 8 or 12 bit per pixel resolution, for example, the resulting image $IMAGE_{FUSED}$ may be converted to a higher bit depth (e.g., 16 bits per pixel resolution) to retain the dynamic range captured from multiple images $IMAGE_1$, $IMAGE_2$. As a result, an example process increases the dynamic range of temperature measurement, and further increases the accuracy of the initial images $IMAGE_1$, $IMAGE_2$. The final temperature measurements shown in $IMAGE_{FUSED}$ have higher precision, as they are derived from multiple images $IMAGE_1$, $IMAGE_2$, when compared to other conventional methods.

During an example operation, a low-cost 8-bit camera may be used instead of cameras with high bits per pixel resolution. The accuracy of the detected temperature readings is substantially improved as the same FOV is captured at different exposure and gain settings, by merging the temperature estimates from valid regions from images $IMAGE_1$, $IMAGE_2$. More than two images including an N-th image $IMAGE_N$ can be used to complement offset errors. Transient errors caused by the dynamic nature of the flame are also reduced by averaging temperatures across valid regions of the images, $IMAGE_1$, $IMAGE_N$, which are taken within a small time window.

An exemplary method of executing the mapping process or method is now described using the mapping unit. It should be understood that the steps within the method may be modified and executed in a different order or sequence without altering the principles of the present disclosure.

The mapping unit builds at least one intensity-temperature graphical relationship of the image pixel intensity I based on the temperature values T and the predetermined device settings $S_1$, $S_2$, or $S_N$. As mentioned above, during the intensity-temperature calibration process, the intensity I of the corresponding image pixel is transformed to the temperature T based on the device settings $S_1$, $S_2$, or $S_N$ of the image-capturing device and the image pixel. This calibration process may be performed either off-line using a black body, or on-line in the enclosure (e.g., furnace), establishing the intensity-temperature relationships at various, different device settings $S_1$, $S_2$, or $S_N$, which are then preferably saved on the data storage device in a server.

A polynomial regression method is preferably performed to the intensity-temperature mapping functions of the selected regions in the FOV of the corresponding image-capturing device. The polynomial regression method can be performed, for example, by performing a least square error or approximation.

The mapping unit selects the first predetermined device setting $S_1$, and sets the first image-capturing device to the selected device setting $S_1$ based on an image analysis. It is also contemplated that the mapping unit may select any one of the predetermined device settings $S_1$, $S_2$, or $S_N$ as an initial device setting. Similarly, the mapping unit may initially set any one of the available image-capturing devices to the selected device setting to suit different applications. An exemplary image analysis is performed by the mapping unit based on a predetermined percentage of acceptable regions in the image captured by the image-capturing device. For example, when a certain percentage (e.g., 20%) of the image is over-saturated or certain regions of interest are over-saturated (e.g., near the burner area), the image-capturing device can automatically switch to a different device setting (e.g., S2) such that the unacceptable regions are not over-saturated.

When the mapping unit determines that the image is over-saturated based on the image analysis, the mapping unit changes the current device setting $S_1$ of the first image-capturing device to the next available device setting S2. During this acquisition time, the mapping unit receives the new device setting S2 (e2, g2) from the data storage device, which was previously saved during the calibration process. If over-saturation is not determined, this step is skipped.

When the new device setting $S_2$ is determined to be acceptable (i.e., the image taken using the new setting $S_2$ is not saturated), the image-capturing device maintains and uses the currently selected device setting $S_2$ for capturing subsequent images. The mapping unit estimates the temperature values of the saturated regions by combining acceptable or valid regions that are unaffected by the over-exposure or underexposure from other images captured by the image-capturing device at the different device setting $S_2$.

Control may then end. However, after building at least one intensity-temperature graphical relationship as set out above, control may simultaneously or alternatively proceed to additional steps to suit a different application. In an example additional step, the mapping unit sequentially captures a predetermined number of images at different device settings (e.g., $IMAGE_1$ at $S_1$, $IMAGE_2$ at $S_2$, and $IMAGE_N$ at $S_N$, where N is an integer). These images are usually obtained in quick succession to minimize the change in furnace and/or heat distribution. For example, the mapping unit selects a set of device settings for different aperture, gain and exposure values from the preset settings that were saved from the calibration process, and captures a sequence of images of the enclosure with each available device setting $S_1$, $S_2$, and $S_N$. If the mean temperature in the enclosure is known based on prior estimates and/or thermal couple readings in the current field of view, the mapping unit may select a subset of preset device settings $[S_K \ldots S_{K+n}]$. These preset settings are based on the minimum and maximum recorded temperatures of the enclosure, so that the images captured at these settings capture the full range of temperatures (i.e. from a minimum temperature to a maximum temperature). The mapping unit selects a subset of acceptable or valid images $IMAGE_{1-M}$, where M<=N, from the set of images taken in the previous step (i.e., $IMAGE_{1-N}$). The selected subset of images $IMAGE_{1-M}$ has image pixels that are neither over-saturated (or overexposed) nor under-saturated (or underexposed).

When the subset of images $IMAGE_{1-M}$ are determined to be acceptable (i.e., not saturated), the image-capturing device maintains and uses the current subset of images for estimating the temperature values. Control can then proceeds to estimation of temperature values of saturated regions and then end.

Next, an example process for intensity-temperature transformation of an imaging system will now be described. An example process performs on-line transformation of the image intensity generated by image-capturing devices to the temperature readings using an imaging system having one or more image-capturing devices and only few temperature sensors.

An example estimation unit, which may be, for example, incorporated into the monitoring unit 10, includes a calibration with temperature input unit, a calibration without temperature input unit, a common FOV localization unit, an intensity to temperature transformation unit, and a dirty lens detection unit. The temperature calibration with temperature input unit includes a temperature sensor localization unit, an intensity, temperature, setting association unit, and a polynomial regression unit. The temperature calibration without temperature input unit includes a common FOV localization unit, a propagated temperature, intensity, setting association unit, and the polynomial regression unit.

The calibration with temperature input unit computes an intensity to temperature calibration using the temperature inputs from a temperature sensor and images from image-capturing devices. A temperature sensor localization unit determines the pixel locations (e.g., x, y coordinates) of the temperature sensor in the images captured by the image capture devices. A group of pixels can be associated with the location of the temperature sensor. Determination of the locations can be performed once, for example, based on inputs from a user, who labels the locations of the sensor in the images. In another embodiment, the calibration with temperature input unit computes the locations using the physical locations of the temperature sensor, the geometrical properties of the enclosure and the configuration and properties of the cameras, such as the FOV, image dimension and the like.

As explained above, a dynamic range of image pixel values is limited to a number of bits per pixel. To cover an entire temperature range for a combustion process (e.g., 0-2500° F. or 0-1400° C.), the device parameters or settings, such as aperture, shutter, and gain, can be selectively set and adjusted. Thus, various intensity-temperature calibration functions can be established based on specific camera settings.

The intensity, temperature, setting association unit assembles sets of pairs of intensity and its corresponding temperature for the image-capturing devices. Each set corresponds to one specific set of camera settings of one image-capturing device. Given the sensor locations in the image from a particular unit, the intensities of the sensor pixels can be extracted from the image. If multiple pixels are assigned to a sensor location, an intensity estimate can be computed based on a smoothing/filtering process, such as average, median, weighed sum, etc. The actual temperature can be acquired from the temperature sensor. Thus a pair of intensity-temperature is collected. A set of these pairs $((i_1, T_1), (i_2, T_2), (i_3, T_3), \ldots, \ldots (i_n, T_n))$ can be assembled in real-time from time $t_1$ to $t_n$ during the furnace operation, each associated with intensity $i_i$ at a different temperature value $T_i$. Alternatively, in another embodiment, multiple temperature sensors can be placed within the FOV of the image-capturing device to get intensity-temperature pairs from a single image captured at time $t_i$.

The polynomial regression unit utilizes a polynomial regression method to compute the transformation or function from intensity to temperature using the set of intensity, temperature, setting associations. The polynomial regression method is done by performing a least square error or approximation. Other suitable weighted, least-square based polynomial regression methods are also contemplated to suit different applications. It is contemplated that the polynomial regression unit also performs this intensity-temperature calibration function on-line. Based on the mapped temperature and intensity values, the polynomial regression unit generates a function between the temperature and the intensity. Each of a spectral band of the image-capturing devices can be calibrated using this on-line method. As an example, a red, green and blue channel of a color video camera can each have its own calibration functions. Historical records of the intensity-temperature calibration are stored in a storage device.

It is desirable to minimize the number of temperature sensors and cables for an enclosure. In a preferred embodiment, a single temperature sensor is shared by at least two image-capturing devices. Particularly, a temperature sensor may be disposed in an area that is within a common field of view of the image-capturing devices. The image-capturing devices may have different device settings to cover different ranges of temperatures in their corresponding FOVs.

Some image-capturing devices may not have a temperature sensor within their FOVs. However, calibration is still needed for the intensity to temperature transformation. The calibration without temperature input unit computes the calibration without input from a temperature sensor using temperature estimates propagated from other temperature images.

The common FOV localization unit determines the pixels in two images that have the same physical locations of the enclosure. These two images are acquired by the image-capturing devices. An example method employs well-established three dimensional geometric computations using the geometrical properties of the furnace and the configuration and properties of the cameras, such as the FOV, image dimension etc. Many-pixels-to-one-pixel, one-pixel-to-many-pixels or one-pixel-to-one-pixel correspondences are possible, depending on the relative viewing aspects of the devices.

A propagated temperature, intensity, and setting association unit assembles sets of pairs of intensity and its corresponding temperature for an image-capturing device. Each set corresponds to one specific camera settings of an image-capturing device. The intensities to be associated with are from those common pixels that are identified by the common FOV localization unit. The corresponding temperatures of these pixels are derived from the common pixels in the temperature image from another image capturing device. In the cases of many-to-one and one-to-many common pixel correspondence, averaging, median selection or other filtering methods can be applied to obtain a one-to-one intensity to temperature association. Then, the polynomial regression unit computes the intensity-temperature calibration function for the image-capturing device.

The on-line calibration is performed by mapping the temperature outputs or readings received from the temperature sensor and the corresponding pixel intensities received from the image-capturing devices. After the mapping, the intensities can be converted to temperature values based on the on-line calibration results. Historical records of the intensity-temperature calibration are stored in a storage device, and subsequently compared by the intensity, temperature, setting association unit. Thus, when the responses from the image-capturing devices are degraded, or the lenses of the devices become dirty, the intensity-temperature calibration values become different from the original or initial values stored in the storage device. When the difference exceeds a predetermined threshold (e.g., 15%) in this example, an indicator can be flagged to signal that system maintenance is required.

The intensity to temperature transformation unit transforms the intensities of the corresponding image to the temperatures based on the device settings of the image-capturing device and the appropriate calibration function. Because the pixels within a common FOV correspond to the same physical area of the enclosure, the pixels should have same temperature outputs in the image-capturing devices. A conflict resolution method can be applied to resolve the temperature differences and update the calibration functions producing more consistent temperature images. Furthermore, in certain embodiments, based on the same temperatures in a common FOV, a chain of propagation can effectively deduce or estimate the temperatures of adjacent FOVs.

The dirty lens detection unit detects and alerts that the lens of the image-capturing devices is dirty based on the degradation in the calibration function. Historical records of the intensity-temperature calibration are stored in a storage device, and subsequently compared by the dirty lens detection unit. Thus, when the responses from the image-capturing devices are degraded, or the lenses of the devices become dirty, the intensity-temperature calibration values become lower from the original or initial values stored in the storage device. When the difference exceeds a predetermined threshold (e.g., 15%) in this example, an indicator is flagged to signal that system maintenance is required. The predetermined threshold is application specific and can be set by an operator.

An exemplary temperature estimation propagation method is now described. First and second image-capturing devices that have a common field of view can propagate the intensity-temperature calibration in a particular FOV, for example, FOV1, to other FOVs, namely FOV2, FOV3, FOV4, and FOVn. The corresponding image-capturing devices have different device settings. When a first image-capturing device, for example, establishes the intensity-temperature calibration for FOV1 either directly based on the temperature readings or outputs from the temperature sensor, or indirectly from propagation, second and third image-capturing devices (for example) can further establish the intensity-temperature calibration for FOV2 based on the calibration of FOV1.

The polynomial regression unit performs the on-line intensity-temperature calibration function by mapping the temperature and the corresponding intensity of the image pixel of the selected FOV. Based on the mapped temperature and intensity values, the polynomial regression unit generates the relationship between the temperature and the intensity for the FOVs captured in image-capturing devices.

A plurality of temperature-intensity pairs are created for generating the calibration relationship by the polynomial regression unit. For example, a temperature reading $T_1$ is received from the temperature sensor that is selectively positioned in a first common overlapping area $AREA_1$ shared by two FOVs (FOV1, FOV2) captured in two image-capturing devices. Because the device settings may be different between the image-capturing devices, two different intensities $I_1$ and $I_2$ may represent the same temperature $T_1$ as two different temperature-intensity pairs, namely $(T_1, I_1)$ and $(T_1, I_2)$.

Using other temperature-intensity pairs calculated in $AREA_1$ of FOV1, the polynomial regression unit generates a first calibration relationship, e.g., graph. Likewise, a second calibration relationship, e.g., graph, is generated using the pairs calculated in $AREA_1$ of FOV2, having different intensity values than the first graph. Thus, the temperature-intensity pair $(T_2, I_2')$ in $AREA_2$ of FOV2 can be deduced based on the calibration relationship in the second graph. Because the temperature $T_2$ has the same value in $AREA_2$ of a third FOV, FOV3, the temperature-intensity pair $(T_2, I_3)$ can be used for calibrating areas outside of $AREA_2$ of FOV3. Accordingly, a third calibration relationship, e.g., graph, is generated using the pairs calculated in $AREA_2$ of FOV3, having different intensity values than the first two graphs.

As is the case with FOV2, the temperature-intensity pair $(T_3, I_3')$ in AREA3 of FOV3 can be deduced based on the calibration relationship in the third graph. Again, because the temperature $T_3$ has the same value in AREA3 of another FOV, FOV4, the temperature-intensity pair $(T_3, I_4)$ can be used for calibrating areas outside of AREA3 of FOV4. The calibration without temperature input unit iteratively performs this propagation method to estimate the temperatures in the n-th field of view FOVn of the n-th image-capturing device.

Referring again to FIG. 2, given the three-dimensional reconstruction computed in step 30, the monitoring unit 10 establishes or sets one or a series of threshold temperatures (step 32) from a range of existing temperatures that may exist within the three-dimensional field being monitored. Using the set threshold values of temperature, the monitoring unit establishes one or more isosurfaces of that temperature (step 34). The monitoring unit 10 then uses the established isosurfaces to define a temperature control volume (step 36). With the temperature control volume defined, the monitoring unit 10 calculates the volume and surface area of the temperature control volume (step 38).

Example calculations can be performed by the monitoring unit 10 upon the data stored in the database, creating calculation results that are stored in additional database locations. The data can then be extracted for various purposes such as, but not limited to, comparison of results and predicted values, or creation of boundary conditions for further study in simulation programs such as computational fluid dynamics.

The monitoring unit 10 then determines, e.g., measures mass flux (mass flow) of a species of interest through the control volume (step 40). The monitoring unit 10 can be configured to know (e.g., have stored therein or be accessible to the monitoring unit) precisely or approximately the mass flow, composition, and quality of reactants such as hydrocarbons entering the determined control volume. Using this information about the reactants and the (three-dimensional) temperature control volume, the monitoring unit 10 can calculate the mass flow rate and residence time through the defined temperature control volume(s) for a species of interest.

Knowing the residence time and temperature of a combustion process within the control volume(s), the monitoring unit 10 can then calculate the destruction efficiency and combustion efficiency for a given moment in time (step 42). Further, in an example method, by comparing the calculated results with the incomplete, partial, or completed products of combustion indicated by the imaging devices (e.g., the cameras 18) to reside within the temperature control volume, the monitoring unit 10 can validate or invalidate the destruction efficiency or combustion efficiency calculations, and can account for or correct differences for that same moment in time.

In some example methods, the monitoring unit 10 establishes a series of temperature control volumes with incrementally increasing or decreasing threshold temperature values in steps 32, 34, and 36. This defines a series of successive temperature control volumes, one encapsulating the other. In this way, the temperature and volume gradient can be established in physical space. By repeating the above-described destruction efficiency and combustion efficiency calculations within the series of temperature control volumes and comparing with the combustion products indicated by the imaging systems acting upon the series of control volumes, the monitoring unit 10 can establish a control volume or volumes where the greatest agreement between calculated and indicated values of combustion products exists. This can increase the accuracy and confidence levels in the overall measurement and imaging system for a moment in time.

Further, in some example methods, the monitoring unit 10 repeatedly conducts the above process over time intervals. In this way, the monitoring unit 10 can establish the rate of emission from the larger observed space, and the extent of observed control volumes. Further, the monitoring unit 10 can establish the time dependent and average and rolling average rates of emissions from or within the combustion system. For example, if a predefined time interval has not been completed (step 44), the monitoring unit 10 can determine a new three-dimensional reconstruction using updated image data from the cameras 18 (step 30). If a predefined time interval has been completed, the monitoring unit can determine the overall destruction efficiency and combustion efficiency over the interval (step 46) using the emission rates of partially and completely combusted products. The process can then end (step 48) or repeat (step 30).

Using example methods, the plurality of cameras 18 (or other imaging devices) observing the flame or flames can be disposed or positioned in such a way as to observe individual flames or multiple flames within the enclosure 12, or observe other combustion control volume or multiple flames in open space. This in turn allows measurement of destruction and combustion efficiency of such individual or multiple flames within the combustion control volume or in open space passively, without interfering, impeding, or altering the combustion process in the enclosure.

Other example embodiments of the invention detect flaring events within an environment having combustion processes therein. Flaring events can be harmful to industry and the environment. However, a flare system is often necessary to mitigate a deviation in a process unit that cannot be managed otherwise.

It is desired to provide ways to minimize, if not avoid, such flaring events to the extent possible. Recently, additional instrumentation has been added to allow more immediate sensing of a process deviation that is likely to lead to a flare event. It is known to install high pressure transmitters on column overhead systems that will isolate a heating medium in a tower automatically. Such systems help reduce environment damage and industry costs by avoiding unnecessary flaring events.

Example methods provided herein increase awareness of flaring events that are not avoided so that they can be more quickly dissected to isolate a root cause and bring deviating equipment back under control. Example methods can also provide more efficient processing of upset, or sub-optimal, conditions to assist with returning a system to normal, or optimal, conditions.

Figure 3:
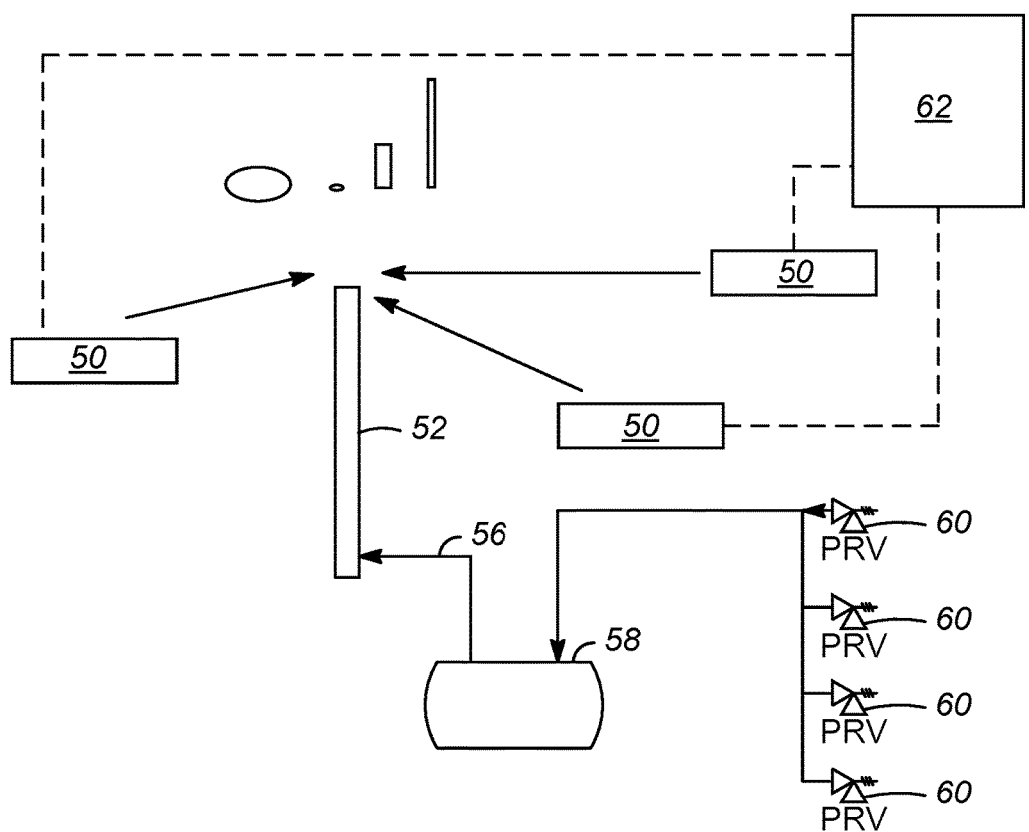
FIG. 3 shows an example combustion environment including a system for detecting a flare event according to an embodiment of the invention.

FIG. 3 shows an example system for detection and profiling of flaring events within an environment having combustion process taking place therein. The environment can be disposed within an enclosure (not shown). The system include two or more (three are shown) cameras 50, or other imaging devices, positioned at two or more (as shown, three) vantage points surrounding a flare 52. For example, the cameras 50 can be fixed or temporarily (movably) mounted on ground based fixtures or structures. As another example, the cameras 50 can be fixed or temporarily (movably) mounted on one or more flying vehicles, which can be manually operated, autonomously operated, remotely controlled, etc. to position the cameras.

The flare 52 is fed a gas to be purged via a line 56 that is coupled to a knockout drum 58 for vapor-liquid separation. The knockout drum 58 is coupled to a plurality of pressure relief valves (PRV) 60. Though a single flare 52 is shown in FIG. 3, multiple flares can be provided.

Each of the cameras 50 are in communication, e.g., via cables or wirelessly, to a monitoring unit 62 that is embodied in or includes an image processor and operator interface. The image processor can be embodied in one or more units (including sub-units in some example embodiments) as described elsewhere herein. The monitoring unit 62 preferably also includes data storage. Data storage can be provided, for example, in a retrievable database upon which real-time or subsequent calculations can be performed. The database can also include data that relates the generated data to other data in three-dimensional space. This data can be used for simulations and real-time process control or optimization. Additional sensors (not shown) can be disposed within the system, including sensors described elsewhere herein.

An example operator interface includes a viewing device for allowing an operator to view conditions in the environment, and one or more controls for affecting one or more process parameters of the combustion process. The viewing device can include or be embodied in a portable computer tablet, a wearable computer display, or an optical head-mounted display that is used to view the interior prospect of an enclosure from any distance or angle of view. The monitoring unit 62 and the viewing device can be separate and coupled to one another, or integrated as a single unit. For example, the monitoring unit 62 can include the viewing device, or the viewing device can include the monitoring unit as an embedded subunit of the viewing device. Other suitable configurations of the monitoring unit 62 and the viewing device are contemplated to suit the application. It is preferred that the monitoring unit 62 and the viewing device communicate wirelessly in real time, but other suitable communication methods are also contemplated to suit different applications.

The viewing device can perform as a virtual window or virtual cut-out on walls of the enclosure for viewing. Optionally, the walls are displayed as virtually transparent for complete viewing of the enclosure. For both cases, such as the virtual window and the transparent furnace wall, a position of the operator can be determined relative to a position of the enclosure such that the operator has a realistic feel of the viewing of the interior prospect of the enclosure.

A position of the viewing device may also be determined based on a location signal received from a global positioning system (GPS) or other suitable location detector, and the location signal may be related to a position of the enclosure to provide a virtual window in the operator's point of view using the location signals received from markers. It is also contemplated that the images transmitted to the monitoring unit can be integrated with or overlaid by other relevant visual elements, such as a textual description including furnace-related information, 3D temperature/radiance fields, furnace geometries, operational details, and the like. For example, the images and related textual descriptions can be combined and compiled in 3D, using separate windows and buttons for displaying additional information with respect to the conditions of the combustion process.

Figure 4:
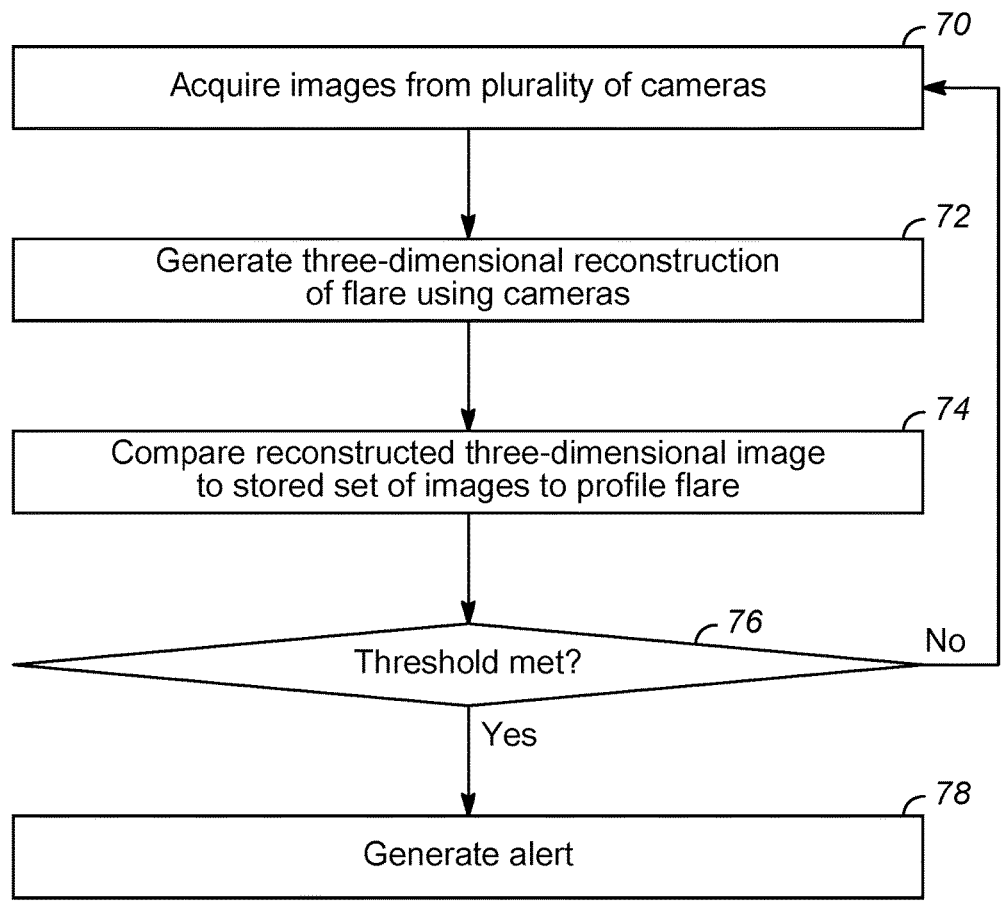
FIG. 4 shows an example method for detecting a flare event.

FIG. 4 shows an example method for detection and profiling of flare events. Images are acquired from a plurality of image-capturing devices, such as the cameras 50 (step 70). A three-dimensional reconstruction of the flare 52 is then generated using the images from the cameras 50 (step 72). In an example method, the cameras 50 in step 70 can provide images of the flare 52 including, for example, the flare tip, in visible or non-visible spectra, and deliver these images to the monitoring unit 62. The monitoring unit 62 employs video processing techniques, and in some methods sensor array techniques, to map three-dimensional images of flames in step 72. Methods for generating a three-dimensional reconstruction can be similar to those provided elsewhere herein.

The monitoring unit 62 then compares the reconstructed three-dimensional image to a stored set (e.g., within a database) of three-dimensional images (step 74). This comparison profiles the flare by determining whether the reconstructed three-dimensional image is similar to or different from one or more of the stored set. Example profiling methods compare flare stack conditions of the flare(s) 52 in operation to conditions that are optimal or sub-optimal (i.e., upset conditions). The images in the stored set can be, for instance, representative images of flare patterns that indicate a normal operation (optimal patterns), or representative images of flare patterns that indicate that the flare has deviated from normal (sub-optimal patterns). FIG. 3 schematically depict a variety of flare tip patterns. It will be appreciated that the depicted flare tip patterns are merely examples. Three-dimensional images can be compared by, for instance, wavelet comparisons, scale variance, differencing, coefficients of radial basis function comparisons, or Fourier transform coefficient comparisons. The results of any of these comparison techniques used singularly, in any combination or in parallel can be scalar values, percentages, arrays, clusters, histograms or gradient zero crossings, etc., which indicate either a difference or a similarity with respect to one or more stored representative images.

In the example method shown in FIG. 4, for each of the representative images to be compared during analysis, the comparison provides a similarity or difference that is compared to a threshold (step 76). The threshold can vary depending on whether a similarity or difference is provided. The results of this comparison, including the similarity or difference and the representative image(s) that was compared, can be stored as data in the database, printed, or displayed via the operator interface. Other related data, such as times, concurrent conditions, etc., can also be stored, printed, or displayed.

If the threshold is met (e.g., exceeds or falls below, depending on the comparison used) (step 76), indicating that the image represents a sub-optimal condition for the flare, an alert can be generated (step 78) via the operator interface of the monitoring unit 62. In this way, operators can be alerted of specific flare patterns to help troubleshoot flaring events, and allow improved management of the loss of process material to the flare 52 and the resulting environmental damage.

Alternatively or additionally, the monitoring unit 62 can output a signal to one or more controls (not shown) to provide process control and assist the system to return to normal conditions. For example, the monitoring unit can initiate the isolation of the heating medium.

Further methods of the present invention use three-dimensional reconstruction to detect combustible and non-combustible leaks. For example, to minimize pollution and provide optimal working conditions for plant personnel, it is desirable to control, e.g., minimize, emissions from process equipment due to leaks at flanges and fittings. To provide such control, it is typical for an industrial environment such as a refinery or chemical plant to employ multiple people each day to inspect the environment and check particular items, such as flanges or fittings, one at a time in a sequential fashion. Typically, a manual, handheld sniffing device is used to check the individual flanges or fittings, which is time-consuming and costly.

Example methods automate data collection to control non-combustible leaks, such as flange leaks, using visual and/or infrared devices to automate checking flanges. Results of such methods are useful for minimizing pollution and improving local conditions in an industrial environment.

Figure 5:
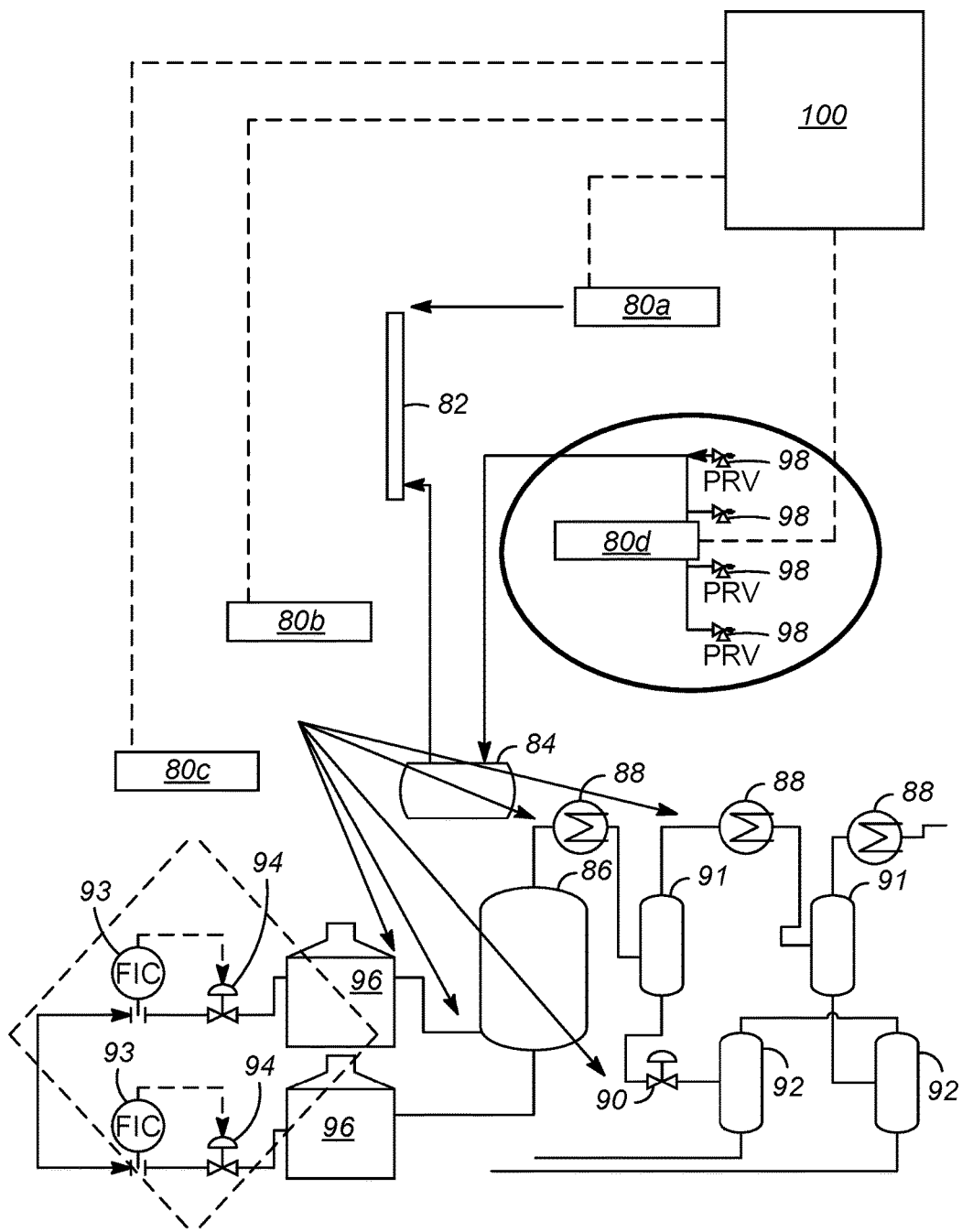
FIG. 5 shows an example processing environment including a system for detecting combustible and non-combustible leaks, according to an embodiment of the invention.

In an example method, cameras or other image capturing devices are disposed or positioned in an environment for monitoring a plurality of items that are subject to leakage. Items can be selected for monitoring based on particular environment operations, for legal or regulatory reasons, etc. FIG. 5 shows an example environment including one or more items for which leaks can be monitored. Cameras 80a-80d are disposed or positioned at various locations within the environment so that one or more monitored items are within the field of view (FOV) of one or more of the cameras. The cameras can use either single point, as with single point view (single point) camera 80a, multipoint (scanning), as with multiple point of view (multiple point) camera 80b, dedicated vision, as with dedicated vision camera 80c, or round vision approaches, as with round vision camera 80d. The cameras 80a-80d are employed either alone or with other cameras or sensors, such as those disclosed elsewhere herein, to provide data on each monitored item to indicate compliance with leak requirements. Cameras and sensors can be fixed or temporarily (movably) mounted on ground based fixtures or structures. As another example, the cameras or sensors can be fixed or temporarily (movably) mounted on one or more flying vehicles, which can be manually operated, autonomously operated, remotely controlled, etc. to position the cameras or sensors.

For example, in the environment shown in FIG. 5, the single point camera 80a is positioned to monitor a flare 82, and the multiple point camera 80b is positioned to monitor a knockout drum 84, a reactor 86, heat exchangers 88, valves 90, hot separators 91, hot flash separators 92, and potentially other items that are within the multiple point camera's 80b field of view. The dedicated vision camera 80c is positioned to monitor flow controls 93, valves 94, and heaters 96. The round vision camera 80d is positioned to monitor several pressure relief valves 98. One or all of these items can be monitored for leak detection.

The cameras 80a-80d are in communication with a monitoring unit 100, which can include one or more units as described elsewhere herein. The example monitoring unit 100 includes, for example, an image processor, data collection and storage, and an operator interface. Data storage can be provided by a retrievable database upon which real-time or subsequent calculation can be performed. The database can also include stored data that can be used to relate incoming or previously stored data it to other data in three-dimensional space. Example data can be used for simulations and real-time process control or optimization.

Figure 6:
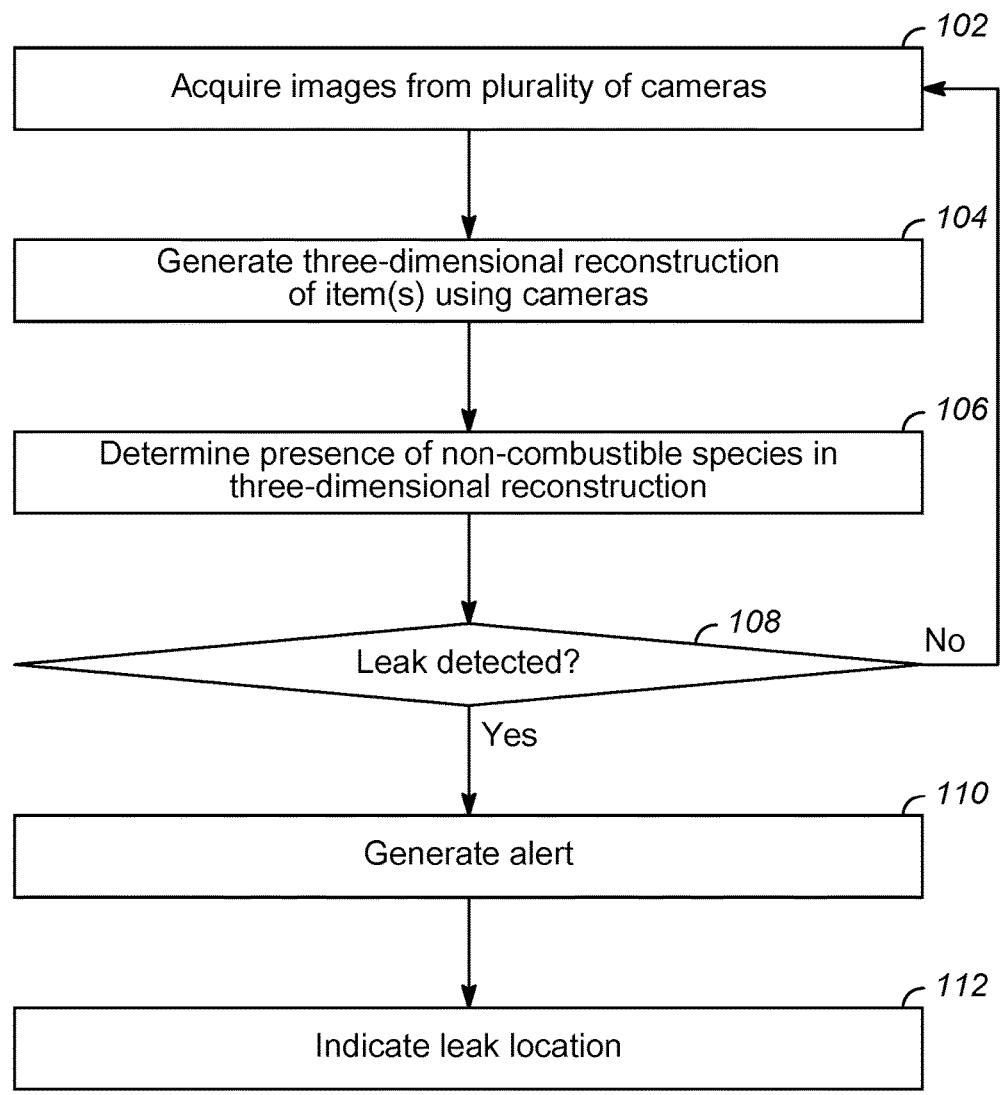
FIG. 6 shows an example method for detecting a non-combustible leak.

FIG. 6 shows an example method for monitoring items for non-combustible leak detection, such as may occur at flanges, as a non-limiting example. The cameras 80a-80d acquire a plurality of images in visible or non-visible spectra (step 102) to provide image data for multiple scanning points. Images from the cameras 80a-80d (or a subset of the cameras) are combined to calculate one or more spectral three-dimensional reconstructions of an entire field of view (step 104), which includes reconstructed images of monitored items. Example items to be monitored include flow controls 92, valves 90, 94, heat exchanges 88, pressure relief valves 98 or other items. Different reconstructions can be generated for various species to detect leaks of particular materials (e.g., hydrocarbons). Example methods for 3D reconstruction can be similar to those described elsewhere herein. Multiple 3D reconstructions can be generated to indicate a change in image within the FOV over time. Voxel resolutions for the three-dimensional images can be limited by resolutions of the cameras 80a-80d, or by processing capacity for the monitoring unit 100.

Given the reconstructed three-dimensional image, the monitoring unit 100 determines whether a leak has occurred within the FOV (step 108). For example, the monitoring unit can detect one or more voxel values within the FOV that indicate the presence of a selected species (step 106), which can be determined by comparing the voxel values to values in data stored within the database indicating presence of a particular species representing a non-combustible leak, and determining whether the voxel value meets or exceeds a predetermined threshold. Three-dimensional images can also be compared to stored representative three-dimensional images as provided in other methods disclosed herein to determine whether a particular representative image is present. If a leak is detected (step 108), the monitoring unit 100 can generate an alert (step 110). In an example method, the monitoring unit 100 also determines a location of the leak (step 112) by, for example, determining where voxel values indicating a leak of particular species intersect in the reconstructed three-dimensional images.

For example, if a leak is detected, the monitoring unit 100 can generate an alert (step 110) for an operator at the operator interface or elsewhere. The monitoring unit 100 can indicate via the operator interface or elsewhere that a leak has been detected, and provide a location of the leak (step 112), and/or additional information such as the associated item, and/or the leaked species. Alternatively or additionally, the monitoring unit 100 can output one or more control signals (not shown) to restrict flow to the items that are detected to be leaking, e.g., by controlling one or more valves, dampers, openings, etc.

Additional inventive methods provide flame detection for detecting combustible leaks in process equipment in industrial environments such as refinery and chemical plants. For example, an uncontrolled fire in a fire box due to a combustible leak is a serious concern in such environments. A quick response to uncontrolled fires is necessary to maintain a safe working environment and to avoid economic loss.

The first task to perform in response to an uncontrolled fire is to detect the fire. Current fire detection methods use fire detection equipment to monitor changes in the ambient conditions within a predefined zone or area within the process area, e.g., within a fire box, to determine if a fire is happening. Such methods have been used to monitor large fires and small fires only when the fires are near the fire sensor in the field. It would be useful to locate the fire sensor near the potential fire zones of the environment.

Figure 7:
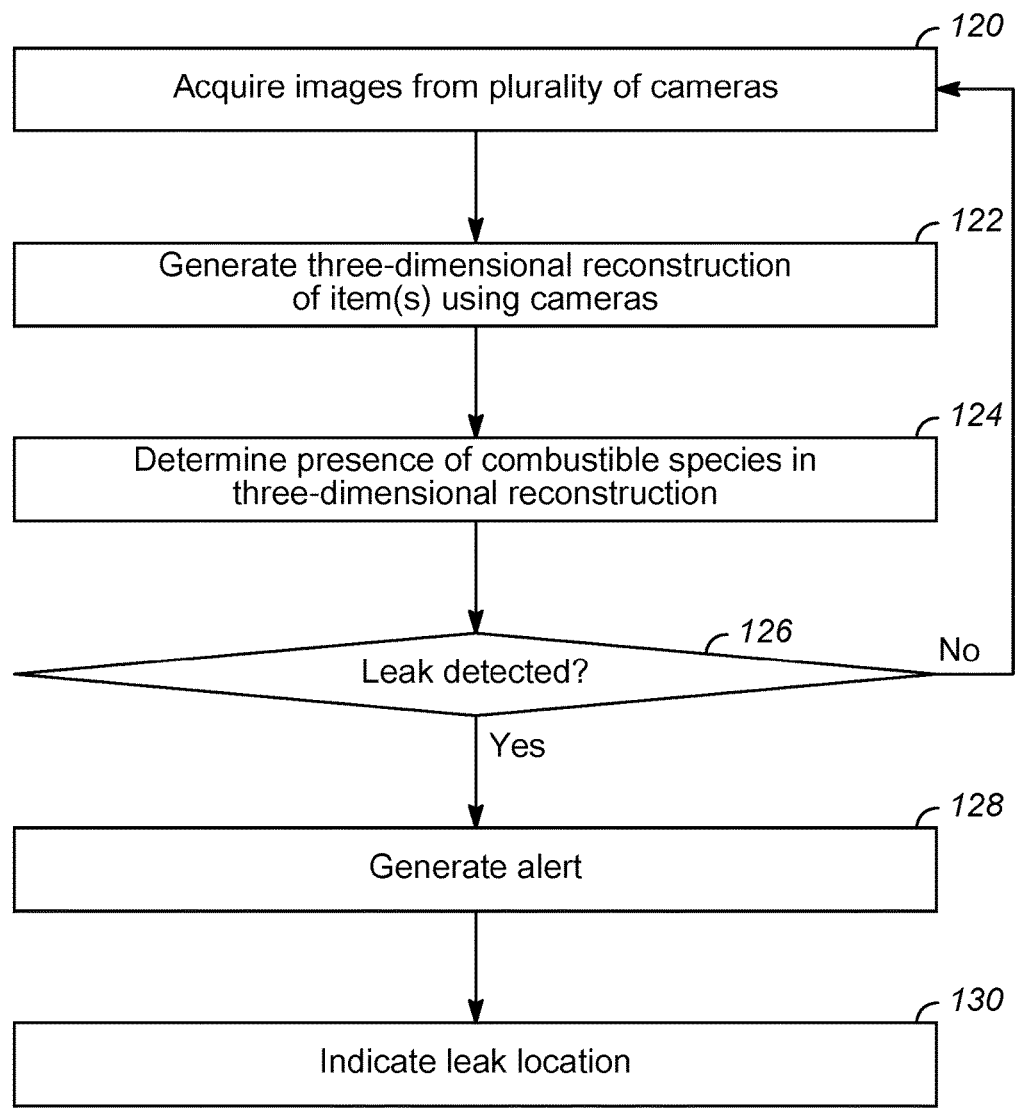
FIG. 7 shows an example method for detecting a combustible leak.

FIG. 7 shows an example method for monitoring items, e.g., process equipment, for detection of uncontrolled flame due to combusting leaks. The example method will be described with reference to the environment shown in FIG. 5. In an example process, the plurality of cameras 80a-80d collect spectral images in visible or non-visible (e.g., infrared or ultraviolet) light of an entire field of view within the environment, which can include one or more monitored items (step 120). The field of view or items that are monitored may be similar items to the field of view or items monitored in the method shown in FIG. 6, or may be alternative or additional fields of view or items. To detect uncontrolled flame, the spectral images can be selected to target different species, such as carbon dioxide, carbon monoxide, hydroxyl, oxygen, water or elemental radicals, as opposed to hydrocarbons.

The monitoring unit 100 acquires and compiles the images from the cameras 80a-80d (step 120), and reconstructs a three-dimensional (3D) view of a selected field of view (FOV) of the environment based on the compiled images (step 122), which includes one or more monitored items. Methods for reconstructing a 3D view can be similar to those described elsewhere herein. The 3D view of the selected FOV can be transmitted wirelessly in real time to the user. As with other example methods disclosed herein, additional sensors can be placed in the environment to provide a sensing network for providing additional monitoring data.

Given the reconstructed three-dimensional image, the monitoring unit 100 determines whether a combustible leak has occurred within the FOV (step 126). For example, the monitoring unit 100 can detect the presence of a particular targeted species representing a combustible leak (step 124). The presence of the species can be determined, e.g., by comparing determined voxel values in the three-dimensional reconstruction of the FOV to data stored within the database indicating presence of a particular species.

To detect whether a combustible leak is present (step 126), the monitoring unit 100 can determine whether the amount of a particular detected species, as indicated by the voxel value comparison, exceeds a predetermined threshold. Three-dimensional images can also be compared to stored representative three-dimensional images as provided in other methods disclosed herein to determine whether a particular representative image is present.

If a combustible leak is detected (and thus an uncontrolled fire), the monitoring unit 100 can generate an alert (step 128) to the operator interface or elsewhere. In an example method, the monitoring unit 100 can also determine and indicate a location of the leak (step 130) by, for example, determining where voxel values indicating a leak of particular species intersect in the reconstructed three-dimensional images. In addition to the location, the monitoring unit 100 can also indicate an associated item from which a combustible leak has occurred (and thus an uncontrolled fire), and/or a leaked species.

Alternatively or additionally, the monitoring unit 100 can output one or more control signals to control process parameters for the monitored item. In an example process for adjusting process parameters, a distributed control system (DCS) (not shown) receives furnace parameters or measurement values from at least one of an air damper position sensor, a fuel pressure sensor, a flapper position sensor, an oxygen sensor, a temperature sensor, a draft sensor, a pressure sensor, and the camera. Similarly, the DCS can receive burner parameters or measurement values from associated burners. The furnace and/or burner parameters can include one or more of a process parameter, a combustion parameter, or an image parameter.

The process parameter, for example, can include a process flow signal, a process flow pressure signal, a process fluid temperature signal, and other process parameter signals, The combustion parameter can include, for example, a fuel pressure signal, a fuel flow signal, a furnace draft signal, an excess air signal, a flue gas signal, (e.g., O2, CO, NOx, gas temperature, etc.), a fuel composition signal, and other combustion parameter signals. The image parameter may include a local heat flux signal, a local CO distribution signal, a flame dimension signal, a flame location signal, a tube temperature signal, a flame stability signal, a local temperature signal, a local excess air signal, and other camera image processing signals. The DCS can generate an individual control signal based on at least one of the process parameter, the combustion parameter, or the image parameter. As an alternative, a control room can be provided for an operator to manually perform adjustments based on one or more parameters.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a method for monitoring combustion products within an environment, the method comprising determining a three-dimensional reconstructed image of temperature and radiance fields within the environment; defining a temperature control volume within the three-dimensional reconstruction using one or more isosurfaces of a threshold temperature; and determining a mass flow rate of one or more species of interest through the defined control volume. An embodiment of the invention is one, any or all of prior embodiments in this paragraph up through the first embodiment in this paragraph, wherein the determining a three-dimensional reconstructed image comprises acquiring a set of images from a plurality of image capturing devices disposed or positioned to provide multiple vantage points within the environment; and computing the three-dimensional reconstructed image from the acquired set of images. An embodiment of the invention is one, any or all of prior embodiments in this paragraph up through the first embodiment in this paragraph, wherein the defining a temperature control volume comprises setting one or more threshold temperatures; providing an isosurface for each of the set threshold temperatures for the determined three-dimensional reconstructed image; and defining the temperature control volume from the provided isosurfaces. An embodiment of the invention is one, any or all of prior embodiments in this paragraph up through the first embodiment in this paragraph, further comprising determining a volume and a surface area of the defined temperature control volume. An embodiment of the invention is one, any or all of prior embodiments in this paragraph up through the first embodiment in this paragraph, further comprising calculating a destruction efficiency using the determined mass flow rate for the one or more species of interest. An embodiment of the invention is one, any or all of prior embodiments in this paragraph up through the first embodiment in this paragraph, further comprising calculating a combustion efficiency using the determined mass flow rate for the one or more species of interest. An embodiment of the invention is one, any or all of prior embodiments in this paragraph up through the first embodiment in this paragraph, wherein the destruction efficiency and the combustion efficiency are repeatedly calculated over a time interval; and wherein the method further comprises determining an overall destruction efficiency and an overall combustion efficiency over the time interval. An embodiment of the invention is one, any or all of prior embodiments in this paragraph up through the first embodiment in this paragraph, wherein the image capturing devices comprise cameras; and wherein the acquired set of images are spectral images for visible, ultraviolet or infrared light.

A second embodiment of the invention is a method for detecting a flaring event within an environment, the method comprising acquiring images of a flare from a plurality of image capturing devices disposed or positioned at a plurality of vantage points within the environment; generating a three-dimensional reconstructed image of the flare using the acquired images; and comparing the three-dimensional reconstructed image to a set of three-dimensional images to detect the flaring event. An embodiment of the invention is one, any or all of prior embodiments in this paragraph up through the second embodiment in this paragraph, wherein the comparing comprises determining a similarity or difference between the three-dimensional reconstructed image and each of the set of three-dimensional images; and determining whether the similarity or difference meets a predetermined threshold. An embodiment of the invention is one, any or all of prior embodiments in this paragraph up through the second embodiment in this paragraph, wherein the comparing uses one or more of wavelet comparison, scale variance, differencing, coefficients of radial basis function comparisons, or Fourier transform coefficient comparisons. An embodiment of the invention is one, any or all of prior embodiments in this paragraph up through the second embodiment in this paragraph, wherein each of the set of three-dimensional images represents an optimal or a suboptimal flare tip pattern. An embodiment of the invention is one, any or all of prior embodiments in this paragraph up through the second embodiment in this paragraph, wherein the set of three-dimensional images are stored within a database accessible by a monitoring unit. An embodiment of the invention is one, any or all of prior embodiments in this paragraph up through the second embodiment in this paragraph, further comprising if the flaring event is detected, generating an alert.

A third embodiment of the invention is a method of detecting a leak of one or more monitored items in an environment, the method comprising acquiring images from a plurality of image capturing devices providing a plurality of vantage points of the one or more monitored items; generating a three-dimensional reconstructed image of a field of view of the environment that includes the one or more monitored items; and determining a presence of a selected species within the three-dimensional reconstructed image to detect the leak. An embodiment of the invention is one, any or all of prior embodiments in this paragraph up through the third embodiment in this paragraph, wherein the determining presence comprises comparing one or more voxel values within the three-dimensional reconstructed image to stored values indicating a presence of the selected species to determine whether the compared voxel values meet or exceed a threshold. An embodiment of the invention is one, any or all of prior embodiments in this paragraph up through the third embodiment in this paragraph, wherein the selected species is selected to indicate a non-combustible leak. An embodiment of the invention is one, any or all of prior embodiments in this paragraph up through the third embodiment in this paragraph, wherein the monitored items include one or more flanges. An embodiment of the invention is one, any or all of prior embodiments in this paragraph up through the third embodiment in this paragraph, wherein the selected species is selected to indicate a combustible leak; and determining that an uncontrolled fire is present in the environment based on the determining a presence of the selected species. An embodiment of the invention is one, any or all of prior embodiments in this paragraph up through the third embodiment in this paragraph, further comprising if the selected species is present, generating an alert.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method for detecting a flaring event within an environment, the method comprising:
   acquiring images of a flare from a plurality of image capturing devices disposed or positioned at a plurality of vantage points within the environment;
   generating a three-dimensional reconstructed image of the flare using said acquired images; and
   comparing the three-dimensional reconstructed image to a set of three-dimensional images to detect the flaring event wherein said comparing comprises:
   determining a similarity or difference between the three-dimensional reconstructed image and each of the set of three-dimensional images;
   determining whether the similarity or difference meets a predetermined threshold; and uses one or more of wavelet comparison, scale variance, differencing, coefficients of radial basis function comparisons, or Fourier transform coefficient comparisons.

2. The method of claim 1, wherein each of the set of three-dimensional images represents an optimal or a sub-optimal flare tip pattern.

3. The method of claim 1, wherein the set of three-dimensional images are stored within a database accessible by a monitoring unit.

4. The method of claim 1, further comprising if the flaring event is detected, generating an alert.

* * * * *